US012273684B2

(12) United States Patent
Von Brasch et al.

(10) Patent No.: US 12,273,684 B2
(45) Date of Patent: Apr. 8, 2025

(54) ACOUSTIC SPOT IDENTIFICATION

(71) Applicant: COCHLEAR LIMITED, New South Wales (AU)

(72) Inventors: Alexander Von Brasch, Macquarie University (AU); Stephen Fung, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 655 days.

(21) Appl. No.: 16/650,906

(22) PCT Filed: Sep. 25, 2018

(86) PCT No.: PCT/IB2018/057420

§ 371 (c)(1),
(2) Date: Mar. 26, 2020

(87) PCT Pub. No.: WO2019/064181

PCT Pub. Date: Apr. 4, 2019

(65) Prior Publication Data

US 2020/0296523 A1 Sep. 17, 2020

Related U.S. Application Data

(60) Provisional application No. 62/563,145, filed on Sep. 26, 2017.

(51) Int. Cl.
*H04R 25/00* (2006.01)

(52) U.S. Cl.
CPC ........... *H04R 25/43* (2013.01); *H04R 25/554* (2013.01); *H04R 2420/07* (2013.01); *H04R 2460/07* (2013.01)

(58) Field of Classification Search
CPC ................ H04R 1/1083; H04R 29/008; H04R 2201/401; H04R 2201/405; H04R 2225/67; H04R 2460/07; G01H 3/125
See application file for complete search history.

(56) References Cited

U.S. PATENT DOCUMENTS 7,206,421 B1 * 4/2007 Taenzer ................ H04R 3/005 381/94.1
8,270,647 B2 * 9/2012 Crawford ............ H04R 25/602 381/324

(Continued)

FOREIGN PATENT DOCUMENTS

CN 104936651 A 9/2015
CN 105407440 A 3/2016

(Continued)

OTHER PUBLICATIONS

International Search Report & Written Opinion for PCT/IB2018/057420, mailed Jan. 16, 2019.

(Continued)

*Primary Examiner* — Ryan Robinson
(74) *Attorney, Agent, or Firm* — Pilloff Passino & Cosenza LLP; Martin J. Cosenza

(57) ABSTRACT

A system, including a central processor apparatus configured to receive input from a plurality of sound capture devices, wherein the central processor apparatus is configured to collectively evaluate the input from the plurality of sound capture devices to identify at least one spatial location that is more conducive to hearing with a hearing prosthesis relative to another spatial location.

49 Claims, 22 Drawing Sheets

(56) References Cited

U.S. PATENT DOCUMENTS

| | | | | |
|---|---|---|---|---|
| 9,042,563 | B1 * | 5/2015 | Beaty | H04R 29/00 381/56 |
| 9,167,359 | B2 * | 10/2015 | Waldmann | H04R 25/70 |
| 9,344,815 | B2 * | 5/2016 | Selig | A61B 5/123 |
| 9,360,546 | B2 * | 6/2016 | Kim | G06F 16/433 |
| 9,401,058 | B2 * | 7/2016 | De La Fuente | G07C 9/37 |
| 9,485,588 | B2 | 11/2016 | Haho et al. | |
| 9,510,123 | B2 * | 11/2016 | Gereb | H04R 29/008 |
| 9,654,868 | B2 * | 5/2017 | Benattar | H04R 29/006 |
| 9,693,152 | B2 * | 6/2017 | Sabin | H04R 25/70 |
| 9,706,292 | B2 * | 7/2017 | Duraiswami | H04R 1/406 |
| 9,877,128 | B2 * | 1/2018 | Cierna | H04M 1/725 |
| 9,913,054 | B2 * | 3/2018 | Beaty | H04S 7/40 |
| 10,096,311 | B1 * | 10/2018 | Sarkar | H04K 3/84 |
| 10,255,285 | B2 * | 4/2019 | Sabin | G10L 25/21 |
| 10,264,373 | B2 * | 4/2019 | Karlsen | H04R 25/607 |
| 10,341,791 | B2 * | 7/2019 | Simonides | H04R 25/70 |
| 10,390,151 | B2 * | 8/2019 | Umicevic | H04W 4/02 |
| 10,409,458 | B2 * | 9/2019 | Yabe | H04N 1/00411 |
| 10,409,548 | B2 * | 9/2019 | Glaser | G06F 3/0482 |
| 10,446,168 | B2 * | 10/2019 | Benway | H04R 1/1083 |
| 10,448,178 | B2 * | 10/2019 | Tawada | H04R 29/00 |
| 10,462,591 | B2 * | 10/2019 | Farber | G06Q 50/01 |
| 10,726,689 | B1 * | 7/2020 | Probin | G08B 13/1672 |
| 10,896,667 | B2 * | 1/2021 | Muggleton | A61F 11/145 |
| 10,909,384 | B2 * | 2/2021 | Matsumoto | G06V 20/52 |
| 2002/0152815 | A1 | 10/2002 | Kurakata et al. | |
| 2006/0067550 | A1 | 3/2006 | Puder et al. | |
| 2011/0222372 | A1 | 9/2011 | O'Donovan et al. | |
| 2012/0250915 | A1 | 10/2012 | Takagi et al. | |
| 2013/0268024 | A1 * | 10/2013 | Goddeeris | H04R 25/70 607/57 |
| 2013/0279727 | A1 * | 10/2013 | Liu | H04R 25/554 381/315 |
| 2015/0134418 | A1 * | 5/2015 | Leow | G06F 16/29 705/7.34 |
| 2015/0360029 | A1 | 12/2015 | Kulkarni | |
| 2016/0007131 | A1 | 1/2016 | Tammi et al. | |
| 2018/0074162 | A1 * | 3/2018 | Jones | G08B 3/10 |
| 2018/0206047 | A1 * | 7/2018 | Naumann | H04R 25/50 |
| 2020/0186905 | A1 * | 6/2020 | Karamuk | H04R 1/1058 |
| 2020/0202626 | A1 * | 6/2020 | Moody | G06T 19/006 |

FOREIGN PATENT DOCUMENTS

| | | | | |
|---|---|---|---|---|
| CN | 105744455 A | | 7/2016 | |
| JP | 2006311202 A | | 11/2006 | |
| JP | 2007142966 A | | 6/2007 | |
| WO | WO-2018087568 A1 | * | 5/2018 | G01H 3/10 |
| WO | WO-2020035143 A1 | * | 2/2020 | G06F 3/162 |

OTHER PUBLICATIONS

Office Action for China Patent Application No. 2018800614724, mailed Dec. 3, 2020.

Office Action for China Patent Application No. 2018800614724, mailed Jul. 5, 2021.

* cited by examiner

ACOUSTIC SPOT IDENTIFICATION

CROSS-REFERENCE TO RELATED APPLICATIONS

This application claims priority to U.S. Provisional Application No. 62/563,145, entitled ACOUSTIC SPOT IDENTIFICATION, filed on Sep. 26, 2017, naming Alexander VON BRASCH of Macquarie University, Australia as an inventor, the entire contents of that application being incorporated herein by reference in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. One example of a hearing prosthesis is a cochlear implant.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from hearing loss typically receive an acoustic hearing aid. Conventional hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve. Cases of conductive hearing loss typically are treated by means of bone conduction hearing aids. In contrast to conventional hearing aids, these devices use a mechanical actuator that is coupled to the skull bone to apply the amplified sound.

In contrast to hearing aids, which rely primarily on the principles of air conduction, certain types of hearing prostheses commonly referred to as cochlear implants convert a received sound into electrical stimulation. The electrical stimulation is applied to the cochlea, which results in the perception of the received sound.

SUMMARY

In accordance with an exemplary embodiment, there is a system, comprising: an central processor apparatus configured to receive input from a plurality of sound capture devices, wherein the central processor apparatus is configured to collectively evaluate the input from the plurality of sound capture devices to identify at least one spatial location that is more conducive to hearing with a hearing prosthesis relative to another spatial location In accordance with another exemplary embodiment, there is a method, comprising: simultaneously capturing sound at a plurality of respective local globally spatially separated locations utilizing respectively located separate sound capture devices; evaluating the captured sound; and developing one or more acoustic landmarks based on the captured sound.

In accordance with another exemplary embodiment, there is a method, comprising: capturing sound at a plurality of respectively effectively spatially separated locations of a locality; evaluating the captured sound; and developing a sound field of the locality.

In accordance with another exemplary embodiment, there is a method comprising: receiving data indicative of sound captured at a plurality of spatially separated locations in a closed environment, wherein the enclosed environment has an acoustic environment such that a given sound has different properties at the different locations owing to the acoustic environment; and evaluating the data to determine at least one spatially linked acoustic related data point based on one or more hearing related features of a specific hearing impaired individual.

BRIEF DESCRIPTION OF THE DRAWINGS

Embodiments are described below with reference to the attached drawings, in which:

FIGS. 3 to 4B present exemplary systems including sound capture devices and a processor apparatus;

FIGS. 4A and 4B present an exemplary functional arrangement detailing communication between black boxes of the hearing prosthesis and remote device(s);

DETAILED DESCRIPTION

Figure 1:
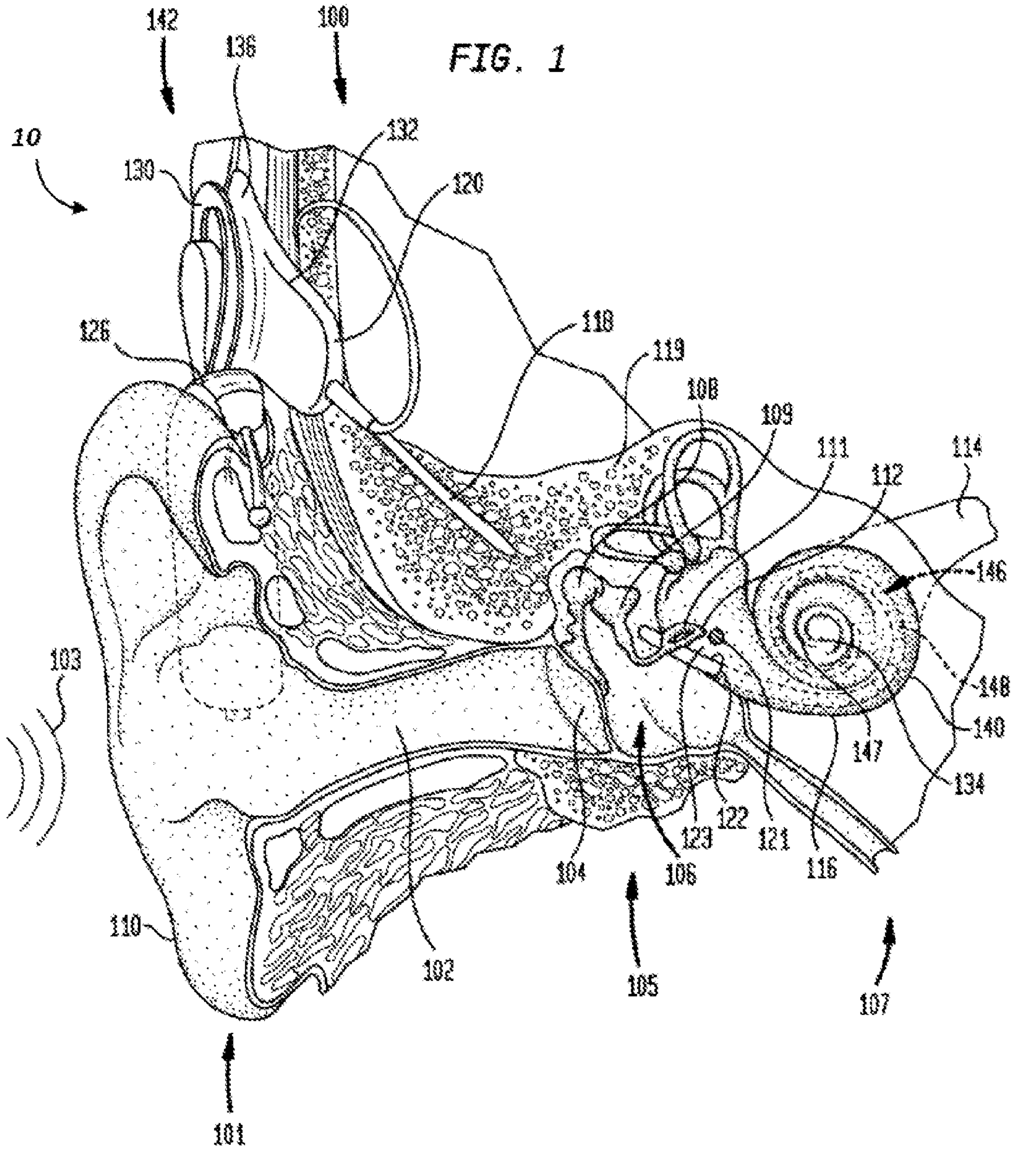
FIG. 1 is a perspective view of an exemplary hearing prosthesis in which at least some of the teachings detailed herein are applicable.

FIG. 1 is a perspective view of a cochlear implant, referred to as cochlear implant 100, implanted in a recipient, to which some embodiments detailed herein and/or variations thereof are applicable. The cochlear implant 100 is part of a system 10 that can include external components in some embodiments, as will be detailed below. It is noted that the teachings detailed herein are applicable, in at least some embodiments, to partially implantable and/or totally implantable cochlear implants (i.e., with regard to the latter, such as those having an implanted microphone). It is further noted that the teachings detailed herein are also applicable to other stimulating devices that utilize an electrical current beyond cochlear implants (e.g., auditory brain stimulators, pacemakers, etc.). Additionally, it is noted that the teachings detailed herein are also applicable to other types of hearing prostheses, such as by way of example only and not by way of limitation, bone conduction devices, direct acoustic cochlear stimulators, middle ear implants, etc. Indeed, it is noted that the teachings detailed herein are also applicable to so-called hybrid devices. In an exemplary embodiment, these hybrid devices apply both electrical stimulation and acoustic stimulation to the recipient. Any type of hearing prosthesis to which the teachings detailed herein and/or variations thereof that can have utility can be used in some embodiments of the teachings detailed herein.

In view of the above, it is to be understood that at least some embodiments detailed herein and/or variations thereof are directed towards a body-worn sensory supplement medical device (e.g., the hearing prosthesis of FIG. 1, which supplements the hearing sense, even in instances where all natural hearing capabilities have been lost). It is noted that at least some exemplary embodiments of some sensory supplement medical devices are directed towards devices such as conventional hearing aids, which supplement the hearing sense in instances where some natural hearing capabilities have been retained, and visual prostheses (both those that are applicable to recipients having some natural vision capabilities remaining and to recipients having no natural vision capabilities remaining). Accordingly, the teachings detailed herein are applicable to any type of sensory supplement medical device to which the teachings detailed herein are enabled for use therein in a utilitarian manner. In this regard, the phrase sensory supplement medical device refers to any device that functions to provide sensation to a recipient irrespective of whether the applicable natural sense is only partially impaired or completely impaired.

The recipient has an outer ear 101, a middle ear 105, and an inner ear 107. Components of outer ear 101, middle ear 105, and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear channel 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 108, the incus 109, and the stapes 111. Bones 108, 109, and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown, cochlear implant 100 comprises one or more components which are temporarily or permanently implanted in the recipient. Cochlear implant 100 is shown in FIG. 1 with an external device 142, that is part of system 10 (along with cochlear implant 100), which, as described below, is configured to provide power to the cochlear implant, where the implanted cochlear implant includes a battery that is recharged by the power provided from the external device 142.

In the illustrative arrangement of FIG. 1, external device 142 can comprise a power source (not shown) disposed in a Behind-The-Ear (BTE) unit 126. External device 142 also includes components of a transcutaneous energy transfer link, referred to as an external energy transfer assembly. The transcutaneous energy transfer link is used to transfer power and/or data to cochlear implant 100. Various types of energy transfer, such as infrared (IR), electromagnetic, capacitive and inductive transfer, may be used to transfer the power and/or data from external device 142 to cochlear implant 100. In the illustrative embodiments of FIG. 1, the external energy transfer assembly comprises an external coil 130 that forms part of an inductive radio frequency (RF) communication link. External coil 130 is typically a wire antenna coil comprised of multiple turns of electrically insulated single-strand or multi-strand platinum or gold wire. External device 142 also includes a magnet (not shown) positioned within the turns of wire of external coil 130. It should be appreciated that the external device shown in FIG. 1 is merely illustrative, and other external devices may be used with embodiments of the present invention.

Cochlear implant 100 comprises an internal energy transfer assembly 132 which can be positioned in a recess of the temporal bone adjacent auricle 110 of the recipient. As detailed below, internal energy transfer assembly 132 is a component of the transcutaneous energy transfer link and receives power and/or data from external device 142. In the illustrative embodiment, the energy transfer link comprises an inductive RF link, and internal energy transfer assembly 132 comprises a primary internal coil 136. Internal coil 136 is typically a wire antenna coil comprised of multiple turns of electrically insulated single-strand or multi-strand platinum or gold wire.

Cochlear implant 100 further comprises a main implantable component 120 and an elongate electrode assembly 118. In some embodiments, internal energy transfer assembly 132 and main implantable component 120 are hermetically sealed within a biocompatible housing. In some embodiments, main implantable component 120 includes an implantable microphone assembly (not shown) and a sound processing unit (not shown) to convert the sound signals received by the implantable microphone in internal energy transfer assembly 132 to data signals. That said, in some alternative embodiments, the implantable microphone assembly can be located in a separate implantable component (e.g., that has its own housing assembly, etc.) that is in signal communication with the main implantable component 120 (e.g., via leads or the like between the separate implantable component and the main implantable component 120). In at least some embodiments, the teachings detailed herein and/or variations thereof can be utilized with any type of implantable microphone arrangement.

Main implantable component 120 further includes a stimulator unit (also not shown) which generates electrical stimulation signals based on the data signals. The electrical stimulation signals are delivered to the recipient via elongate electrode assembly 118.

Elongate electrode assembly 118 has a proximal end connected to main implantable component 120, and a distal end implanted in cochlea 140. Electrode assembly 118 extends from main implantable component 120 to cochlea 140 through mastoid bone 119. In some embodiments electrode assembly 118 may be implanted at least in basal region 116, and sometimes further. For example, electrode assembly 118 may extend towards apical end of cochlea 140, referred to as cochlea apex 134. In certain circumstances, electrode assembly 118 may be inserted into cochlea 140 via a cochleostomy 122. In other circumstances, a cochleostomy may be formed through round window 121, oval window 112, the promontory 123 or through an apical turn 147 of cochlea 140.

Electrode assembly 118 comprises a longitudinally aligned and distally extending array 146 of electrodes 148, disposed along a length thereof. As noted, a stimulator unit generates stimulation signals which are applied by electrodes 148 to cochlea 140, thereby stimulating auditory nerve 114.

Figure 2A:
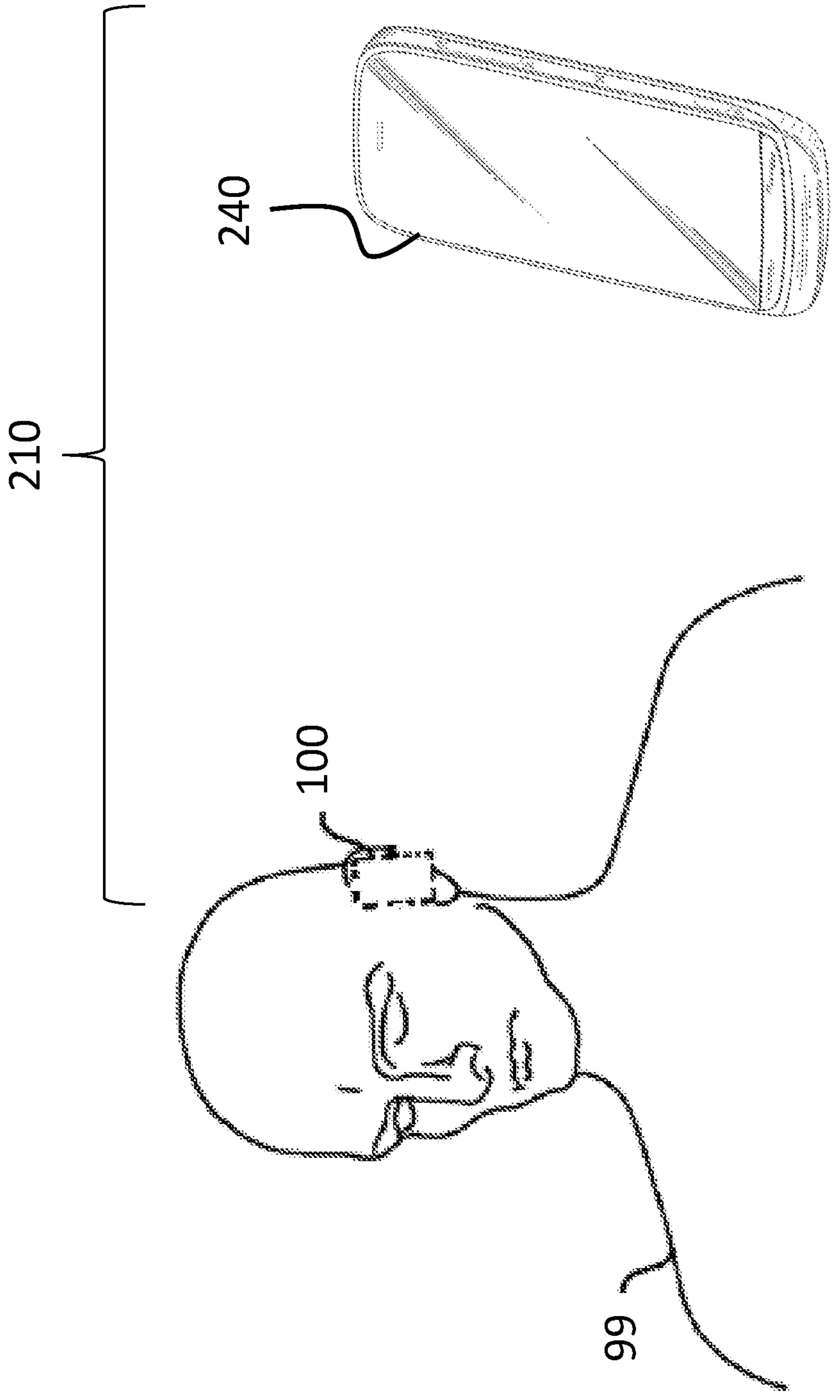
FIGS. 2A and 2B present an exemplary system including a hearing prosthesis and a remote device in the form of a portable hand-held device.
Figure 2B:
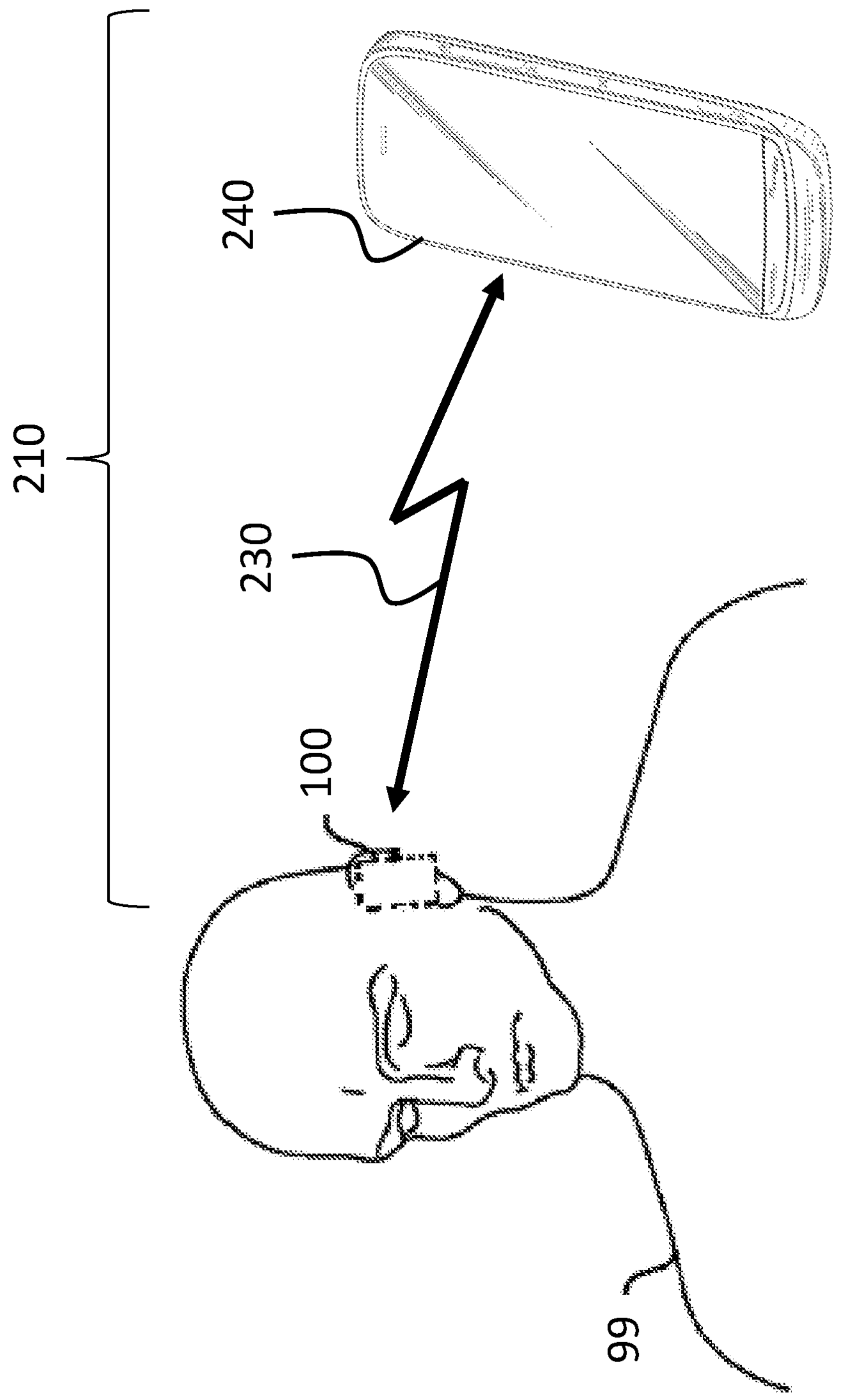

FIGS. 2A and 2B depict an exemplary system 210 according to an exemplary embodiment, including hearing prosthesis 100, which, in an exemplary embodiment, corresponds to cochlear implant 100 detailed above, and a portable handheld device 240. The embodiment of FIG. 2B has a wireless link 230 with the hearing prosthesis 100, whereas the alternate embodiment depicted in FIG. 2A does not have such a link. In an exemplary embodiment, the hearing prosthesis 100 is an implant implanted in recipient 99 (as represented functionally by the dashed lines of box 100 in FIGS. 2A/2B). In an exemplary embodiment, as represented in FIG. 2B, the system 210 is configured such that cochlear implant 100 and the portable handheld device 240 (e.g., a portable cellular telephone, such as by way of example only and not by way of limitation, a smart phone as that phrase is utilized generically) have a relationship. By way of example only and not by way of limitation, in an exemplary embodiment, the relationship is the ability of the smartphone to serve as a control device of the hearing prosthesis 100 via the wireless link 230 and/or to audio stream an audio signal captured by the microphone of the smartphone to the hearing prosthesis so the hearing prosthesis can evoke a hearing percept based on that audio stream (other relationships exist, as will be detailed). That said, in some embodiments, there is no definitive relationship between the two devices. Instead, the two devices can be utilized simultaneously to achieve utilitarian value, as will be described below. Indeed, in some exemplary embodiments, the remote device 240 is never in signal communication with the hearing prosthesis. The two devices work completely autonomously, although in some such exemplary embodiments, one or both of the devices can be "aware" that one or both devices are being utilized simultaneously with the other. Some additional details of this will be described below. To be clear, in some embodiments, the remote device cannot be used to actively adjust the prosthesis 100, but such does not exclude the ability of the remote device to provide a prompt to the recipient indicating that there can be utilitarian value with respect to the recipients adjusting the hearing prosthesis 100.

It is noted that while the embodiments detailed herein will be often described in terms of utilization of a cochlear implant, alternative embodiments can be utilized in other types of hearing prostheses, such as by way of example only and not by way of limitation, bone conduction devices (percutaneous, active transcutaneous and/or passive transcutaneous), Direct Acoustic Cochlear Implants (DACI), and conventional hearing aids. Accordingly, any disclosure herein with regard to one of these types of hearing prostheses corresponds to a disclosure of another of these types of hearing prostheses or any other prosthetic medical device for that matter, unless otherwise specified, or unless the disclosure thereof is incompatible with a given hearing prosthesis based on the current state of technology.

Figure 3:
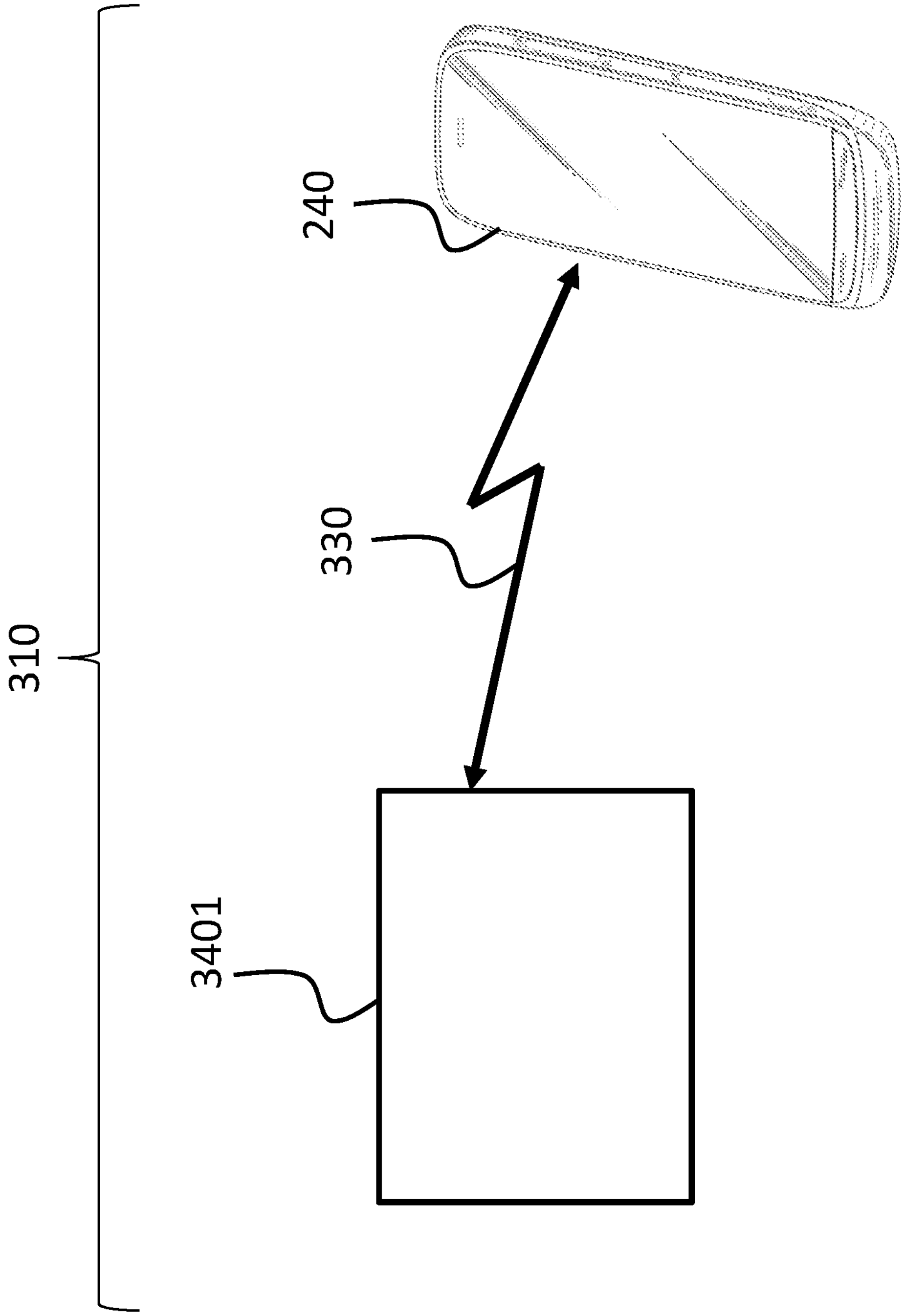

FIG. 3 depicts another exemplary embodiment of system 310, which system includes the aforementioned smart phone, which is in signal communication via wireless link 330 with a central processor apparatus 3401, the details of which will be described in greater detail below. In this exemplary embodiment, the smart phone 240, which can be also be a generic cellular phone in some other embodiments, is configured to capture sound utilizing the microphone thereof, and provide the sound that is captured via link 330 to the processor apparatus 3401. In an exemplary embodiment, link 330 is utilized to stream the captured audio signal captured by the microphone of the phone 240 utilizing an RF transmitter, and the processor apparatus 3401 includes an RF receiver that receives the transmitted RF signal. That said, in an exemplary embodiment, the phone 240 utilizes an onboard processor or the like to evaluate the signal, and provides a signal based on the captured sound that is indicative of the evaluation to the processor apparatus 3401. Some additional features of this will be described in greater detail below.

Figure 4A:
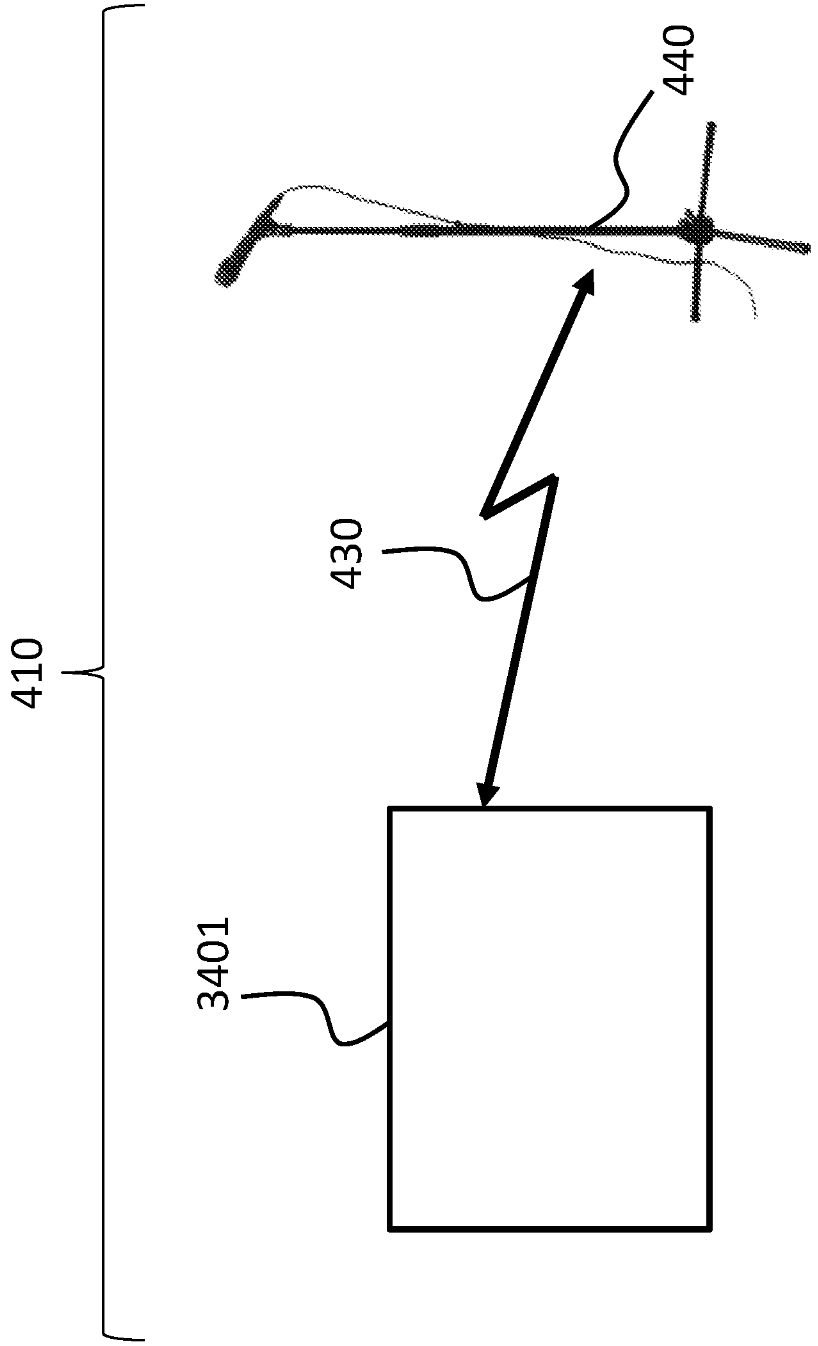
Figure 4B:
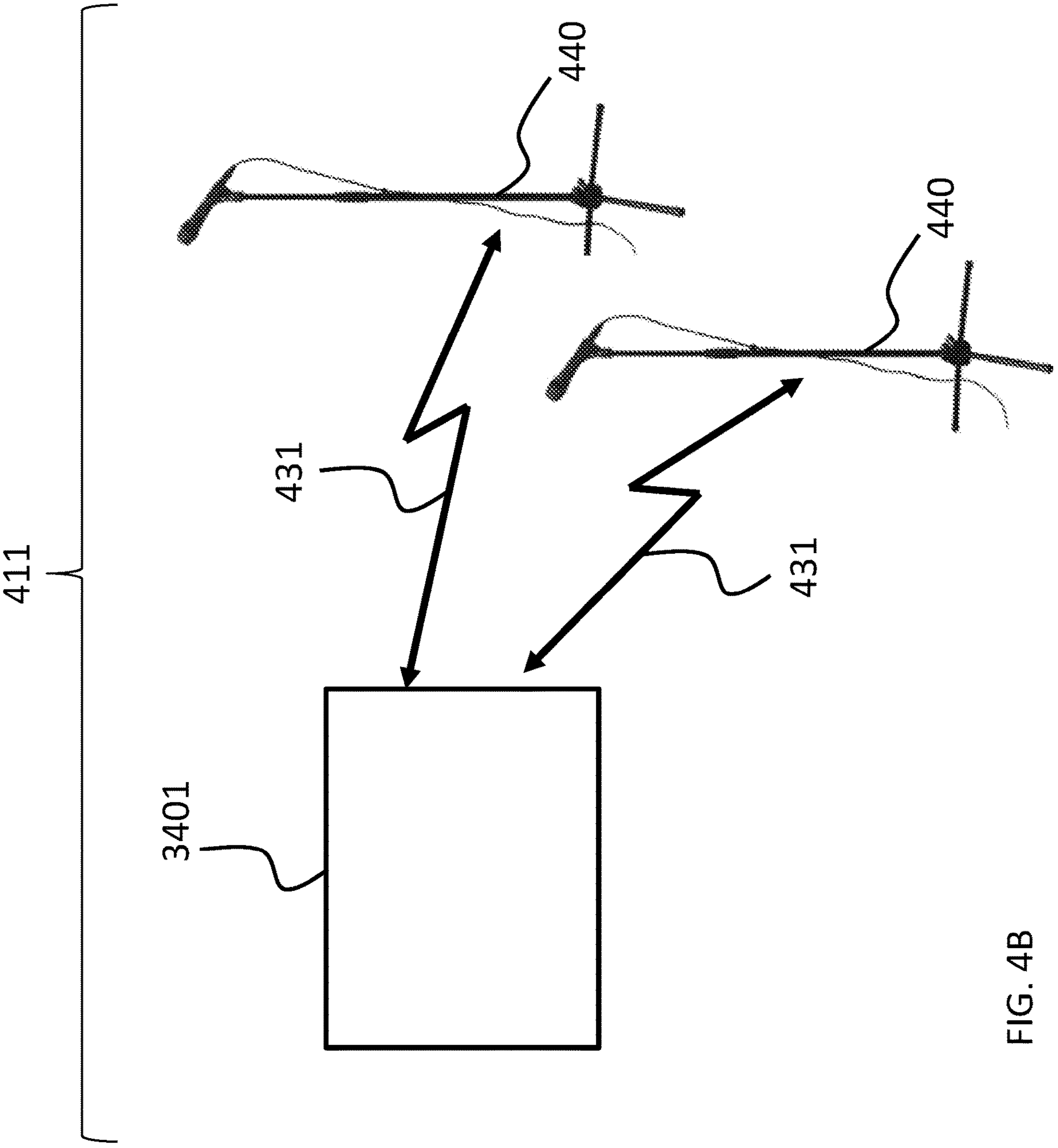

FIG. 4A depicts an alternate embodiment of a system 410 where a microphone 440 is utilized to capture sound. In an exemplary embodiment, microphone 440 operates in accordance with the microphone detailed above with respect to FIG. 3. That said, in an exemplary embodiment, microphone 440 can be a smart microphone, which includes a processor or the like in the assembly thereof, that can evaluate the captured sound at the location and provide a signal via the wireless link 430 to the processor apparatus 3401 which includes data that is based on the captured sound captured by microphone 440 in accordance with the alternate embodiment detailed above with respect to FIG. 3. FIG. 4B depicts an alternate embodiment of a system 411 that includes a plurality of microphones 440 that are in signal communication via the respective wireless links 431.

In view of the above, it is to be understood that in an exemplary embodiment, there is a system, comprising a central processor apparatus configured to receive input from a plurality of sound capture devices, such as, for example, the smartphones 240 and/or the microphones 440 detailed above, and/or from microphones or other sound capture devices of a hearing prosthesis and/or someone else's hearing prosthesis (in an exemplary embalmment, one or more of the sound capture devices are respective sound capture devices of hearing prostheses of people in the area, where the hearing prostheses are in signal communication with the central processor (directly or indirectly, such as, with respect to the latter, through a smart phone, or a cell phone, etc.) such an embodiment can also enable a dynamic system where the microphones move around from location to location, which can also be the case with, for example, the smart phones). As noted above, the input can be the raw signal/modified signal (e.g., amplified and/or some features taken out/compression techniques can be applied thereto) from the microphones of the sound capture devices. Thus, in an exemplary embodiment, there is a system that includes microphones that are configured to output respective signals indicative of respective captured sounds. The system is further configured to provide the respective signals and/or modified signals based on the respective signals to the central processor apparatus as input from the plurality of sound capture devices. Conversely, in some embodiments, the input can be a signal that is based on the sound captured by the microphones, but the signal is a data signal that results from the processing or otherwise the evaluations of the microphones, which data signal is provided to the central processor apparatus 3401. In this exemplary embodiment, the central processor apparatus is configured to collectively evaluate the input from the plurality of sound capture devices.

In an exemplary embodiment, the processor apparatus includes a processor, which processor of the processor apparatus can be a standard microprocessor supported by software or firmware or the like that is programmed to evaluate the signal received from the sound capture device(s). By way of example only and not by way of limitation, in an exemplary embodiment, the microprocessor can have access to lookup tables or the like having data associated with spectral analysis of a given sound signal, by way of example, and can compare features of the input signal and compare those features to features in the lookup table, and, via related data in the lookup table associated with those features, make a determination about the input signal, and thus make a determination related to the sound and/or classifying the sound. In an exemplary embodiment, the processor is a processor of a sound analyzer. The sound analyzer can be FFT based or based on another principle of operation. The sound analyzer can be a standard sound analyzer available on smart phones or the like. Sound analyzer can be a standard audio analyzer. The processor can be part of a sound wave analyzer. Moreover, it is specifically noted that while the embodiment of the figures above present the processor apparatus 3401, and thus the processor thereof, is a device that is remote from the hearing prosthesis and/or the smart phones, etc., the processor can instead be part of one of the devices of the hearing prosthesis or the portable electronics device (e.g., smart phone, or any other device that can have utilitarian value with respect to implementing the teachings detailed herein). Still, consistent with the teachings above, it is noted that in some exemplary embodiments, the processor can be remote from the prosthesis and the smart phones or other portable consumer electronic devices.

By way of example only and not by way of limitation, in an exemplary embodiment, any one or more of the devices of systems detailed herein can be in signal communication via Bluetooth technology or other RF signal communication systems with each other and/or with a remote server that is linked, via, for example, the Internet or the like, to a remote processor. Indeed, in at least some exemplary embodiments, the processor apparatus 3401 is a device that is entirely remote from the other components of the system. That said, in an exemplary embodiment, the processor apparatus 3401 is a device that has components that are spatially located at different locations in a global manner, which components can be in signal communication with each other via the Internet or the like. In an exemplary embodiment, the signals received from the sound capture devices can be provided via the Internet to this remote processor, whereupon the signal is analyzed, and then, via the Internet, the signal indicative of an instruction related to data related to a recipient of the hearing prostheses can be provided to the device at issue, such that the device can output such. Note also that in an exemplary embodiment, the information received from the remote processor can simply be the results of the analysis, whereupon the processor can analyze the results of the analysis, and identify information that will then be outputted as will be described in greater detail below. It is noted that the term "processor" as utilized herein, can correspond to a plurality of processors linked together, as well as one single processor.

In an exemplary embodiment, the system includes a sound analyzer in general, and, in some embodiments, a speech analyzer in particular, such as by way of example only and not by way of limitation, one that is configured to perform spectrographic measurements and/or spectral analysis measurements and/or duration measurements and/or fundamental frequency measurements. By way of example only and not by way of limitation, such can correspond to a processor of a computer that is configured to execute the SIL Language Technology Speech Analyzer™ program. In this regard, the program can be loaded onto memory of the system, and the processor can be configured to access the program to analyzer otherwise evaluate the speech. In an alternate embodiment, the speech analyzer can be that available from Rose Medical, which programming can be loaded one to the memory of the system.

In an exemplary embodiment, the central processing assembly can include an audio analyzer, which can analyze one or more of the following parameters: harmonic, noise, gain, level, intermodulation distortion, frequency response, relative phase of signals, etc. It is noted that the above-noted sound analyzers and/or speech analyzers can also analyze one or more of the aforementioned parameters. In some embodiments, the audio analyzer is configured to develop time domain information, identifying instantaneously amplitude as a function of time. In some embodiments, the audio analyzer is configured to measure intermodulation distortion and/or phase. In an exemplary embodiment, the audio analyzer is configured to measure signal-to-noise ratio and/or total harmonic distortion plus noise.

To be clear, in some exemplary embodiments, the central processor apparatus can include a processor that is configured to access software, firmware and/or hardware that is "programmed" or otherwise configured to execute one or more of the aforementioned analyses. By way of example only and not by way of limitation, the central processor apparatus can include hardware in this form of circuits that are configured to enable the analysis detailed above and/or below, the output of such circuitry being received by the processor so that the processor can utilize that output to execute the teachings detailed herein. In some embodiments, the processor apparatus utilizes analog circuits and/or digital signal processing and/or FFT. In an exemplary embodiment, the analyzer engine is configured to provide high precision implementations of AC/DC voltmeter values, (Peak and RMS), the analyzer engine includes high-pass and/or low-pass and/or weighting filters, the analyzer engine can include bandpass and/or Notch filters and/or frequency counters, all of which are arranged to perform an analysis on the incoming signal so as to evaluate that signal and identify certain characteristics thereof, which characteristics are correlated to predetermined scenarios or otherwise predetermined instructions and/or predetermined indications as will be described in greater detail below. It is also noted that in systems that are digitally based, the central processor apparatus is configured to implement signal analysis utilizing FFT based calculations, and in this regard, the processor is configured to execute FFT based calculations.

In an exemplary embodiment, the central processor apparatus is a fixture of a given building (environmental structure). Alternatively and/or in addition to this, the central processor apparatus is a standalone portable device that is located in a case or the like that can be brought to a given location. In an exemplary embodiment, the central processor apparatus can be a personal computer, such as a laptop computer, that includes USB port inputs and/or outputs and/or RF receivers and/or transmitters and is programmed as such (e.g., the computer can have Bluetooth capabilities and/or mobile cellular phone capabilities, etc.). In an exemplary embodiment, the central processor apparatus is configured to receive input and/or provide output utilizing the aforementioned features or any other features.

Figure 5:
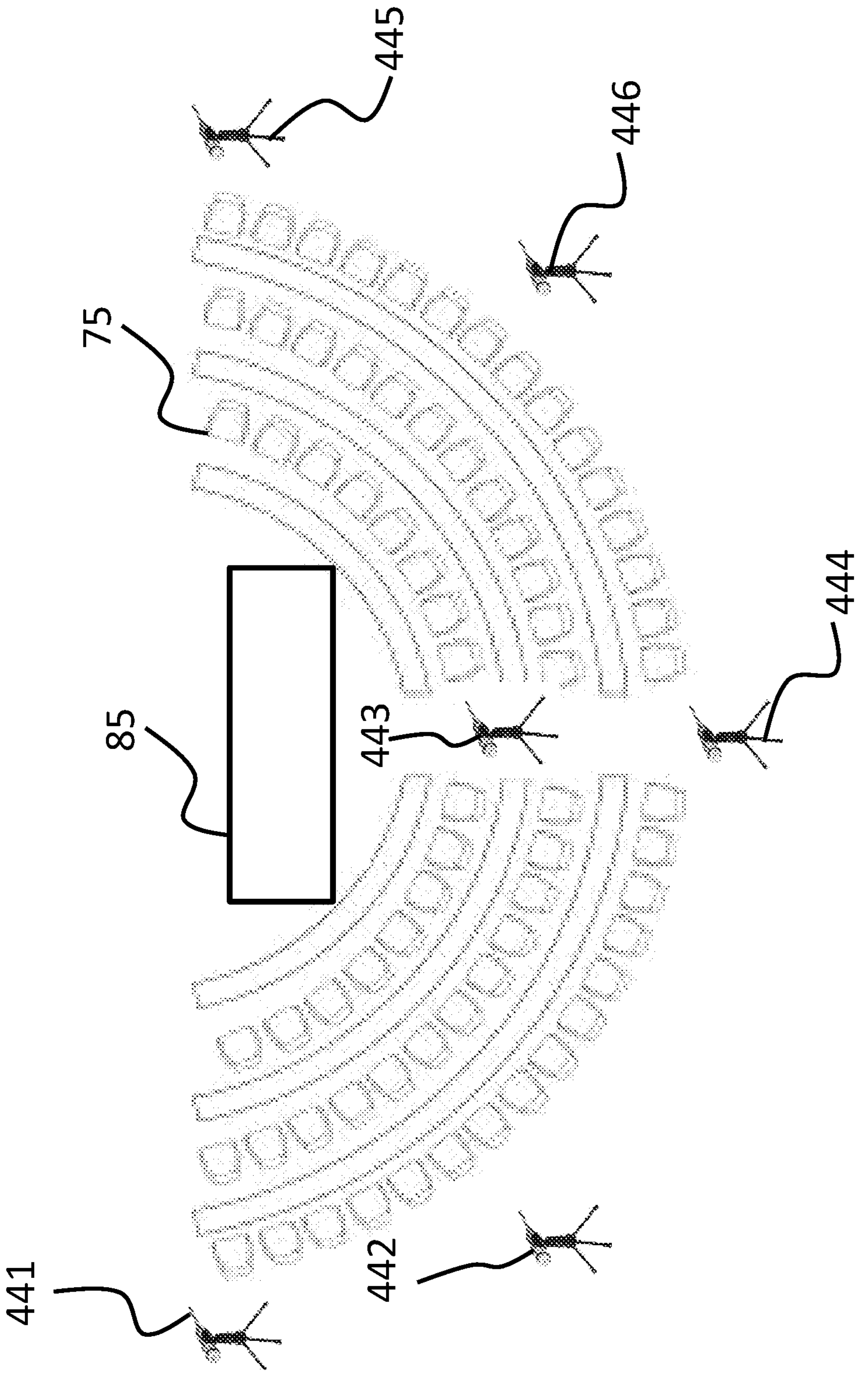
FIG. 5 presents an exemplary embodiment of a sound environment with sound capture devices interposed therein.

Returning to the embodiment of FIGS. 3 to 4B, etc., in an exemplary embodiment, the central processor apparatus is configured to collectively evaluate the input from the plurality of sound capture devices to identify at least one spatial location that is more conducive to hearing with a hearing prosthesis relative to another spatial location. In this regard, in an exemplary embodiment, FIG. 5 depicts an exemplary structural environment comprising seats 75 and a stage 85 or otherwise an area in which a human speaker or someone or something that generates sound will be located (e.g., a band, a speaker of a stereo or the like, a television having speaker(s) thereabout, etc.). In this exemplary embodiment, there is a plurality of microphones present in the environment: a first microphone 441, second microphone 442, a third microphone 443, a fourth microphone 444, a fifth microphone 445, and a sixth microphone 446. In some embodiments, fewer or more microphones can be utilized. In this exemplary embodiment, the microphones are located in a known manner, which coordinates are provided to the central processor apparatus. In an exemplary embodiment, the microphones 44X (which refers to microphones 441-446) include global positioning system components and/or include components that communicate with a cellular system or the like that enable the positions of these microphones to be determined via the central processor apparatus. In an exemplary embodiment, the microphones have markers, such as infrared indicators and/or RFID indicators and/or RFID transponders, that are configured to provide an output to another device, such as the central processor apparatus, that can determine spatial locations of the microphones into one, two and/or three dimensions based on the output, which locations can be relative to the various microphones and/or relative to another component, such as the central processing assembly, or to another component not associated with the system, such as relative to the stage 85, where the stage can also include one or more of the aforementioned devices that have utility with respect to determining spatial location of the various locations that are of interest. Still further, in some embodiments, the devices of the microphones can be passive devices, such as reflectors or the like, that simply reflect a laser beam back to an interrogation device, based on the reflection, the device can determine the spatial locations of the microphones relative to each other and/or relative to another point.

In an exemplary embodiment, microphones 44X are in wired and/or wireless communication with the central processor apparatus, such as in some embodiments where the central processor apparatus is co-located globally with the microphones.

The above-noted ability to collectively evaluate the input from the various sound capture devices and identify at least one spatial location that is more conducive to the hearing with the hearing prosthesis relative to another spatial location can have utilitarian value in a scenario, such as an exemplary scenario according to an exemplary embodiment, where the acoustic environment of a given location (e.g., an auditorium, a theater, a classroom, a movie theater) changes dynamically (e.g., because more people have entered the given structure, because people have left the given structure, because furniture has been moved, because the sources of sound have been moved, etc.). This is opposed to an exemplary scenario where the acoustic environment is effectively static. In an exemplary embodiment, hearing with a hearing prosthesis, such as by way of example only and not by way of limitation, hearing utilizing a cochlear implant, will be different for the recipient vis-à-vis the sensorineural process that occurs that results in the evocation of a hearing percept utilizing the cochlear implant, than what many recipients had previously experienced. Indeed, in an exemplary embodiment, this is the case with respect to a recipient that had previously had natural hearing and/or utilized conventional hearing aids prior to obtaining his or her cochlear implant. In some embodiments of the teachings detailed herein, such can alleviate or otherwise mitigate, if only partially, the presence of an unnoticeable noise source, the presence of location of objects (e.g. walls, window, door, etc.), and/or even the structure of an object (e.g., a corner) that might affect the hearing perception of a recipient of the hearing prostheses in a manner that is less than utilitarian. In an exemplary embodiment, the teachings detailed herein can be utilized in conjunction with noise cancellation and/or suppression systems of the hearing prosthesis, and thus can supplement such. In at least some exemplary embodiments, the teachings detailed herein can be utilized to improve a hearing performance in an environment by identifying a location and/or a plurality of locations which is more conducive to hearing with the hearing prosthesis relative to other locations. By way of example only and not by way of limitation, the teachings detailed herein can be utilized to locate a location and/or a plurality of locations which have relatively less noise and/or reverberation interference with respect to other locations. Moreover, as will be detailed below, in some exemplary embodiments, the teachings detailed herein include devices, systems, and methods that evaluate a given sound environment and determine a given location that has more utility with respect to hearing with the prosthesis relative to other locations based on not only the input from the various sound capture devices, but also based on the recipient's hearing profile. In an exemplary embodiment, the teachings detailed herein provide a device, system, and method that identify location(s) where the recipient can have maximum comfort with respect to utilizing his or her hearing prostheses and/or will experience maximum audibility using the hearing prostheses.

It is noted that while the embodiments detailed herein have focused on about 6 or fewer sound capture devices/microphones, in an exemplary embodiment, the teachings detailed herein can be executed utilizing, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or 50 or 60 or 70 or 80 or 90 or 100 microphones or more, or any value or range of values therebetween in increments of 1), which microphones can be utilized to sample or otherwise capture an audio environment all simultaneously or some of them simultaneously, such utilizing F number of microphones simultaneously from a pool of H number of microphones, where F and H can be any number of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or 50 or 60 or 70 or 80 or 90 or 100 (or any number therein, in increments of 1) providing that H is greater than F by at least 1. In an exemplary embodiment, some of the microphones can be statically located in the sound environment during the entire period of sampling, while others can move around or otherwise be moved around. Indeed, in an exemplary embodiment, one subset of microphones remain static during the sampling while other microphones are moved around during the sampling.

It is noted that in at least some exemplary embodiments, sampling can be executed once every or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or 50 or 60 or 70 or 80 or 90 or 100 (or any number therein in increments of 1) seconds, minutes or hours and/or that number of times during a given sound event, and in some other embodiments, sound capture can occur continuously for or for at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or 40, or 50 or 60 or 70 or 80 or 90 or 100 (or any number therein in increments of 1) seconds or minutes or potentially even hours. In some embodiments, the aforementioned sound capture is executed utilizing microphones that remain in place and are not moved during the aforementioned temporal periods of time. In an exemplary embodiment, every time a sampling is executed, one or more or all of the method actions detailed herein can be executed based thereon. That said, in an exemplary embodiment, the sampling can be utilized as an overall sample and otherwise statistically managed (e.g., averaged) and the statistically managed results can be utilized in the methods herein.

In at least some exemplary embodiments, none of the microphones are moved during the period of time that one or more or all of the methods detailed herein are executed. In an exemplary embodiment, more than 90, 80, 70, 60, or 50% of the microphones remain static and are not moved during the course of the execution of the methods herein. Indeed, in an exemplary embodiment, such is concomitant with the concept of capturing sound at the exact same time from a different number of locations that are known. To be clear, in at least some exemplary embodiments, the methods detailed herein are executed without someone moving a microphone from one location to another, at least not in a meaningful way (e.g., the smart phones may be moved a few inches or even a foot or two, but such is not a change to any local position with respect to the global environment). The teachings detailed herein can be utilized to establish a sound field in real-time or close thereto by harnessing signals from multiple mics in a given sound environment. The embodiments herein can provide the ability to establish a true sound field, as opposed to merely identifying the audio state at a single point at a given instant. In this regard, the teachings detailed herein can be utilized to provide advice to a given recipient as to where he or she should go in the enclosed volume, as opposed to whether or not a given location is simply good or bad.

Consistent with the teachings detailed herein, owing to the ability to repeatedly sample and acoustic environment from static locations that remain constant, such as the ability to do so according to the aforementioned temporal periods and/or according to the number of times in the aforementioned temporal periods, the devices, systems, and/or methods herein can thus address and otherwise deal with a rapid change in an audio signal and/or with respect to an audio level at one or more locations.

In an exemplary embodiment, methods, devices, and systems detailed herein can include continuously sampling an audio environment. By way of example only and not by way of limitation, in an exemplary embodiment, the audio environment can be sampled utilizing a plurality of microphones, where each microphone capture sound at effectively the exact same time, and thus the samples occur effectively at the exact same time.

It is noted that the teachings detailed herein are applicable to sound environments that have a significant time dynamic. In exemplary embodiments, the teachings detailed herein are directed to periods of time that are not small, but instead, are significant, as will be described in greater detail below.

In an exemplary embodiment, the central processor apparatus is configured the central receive input pertaining to a particular feature of a given hearing prosthesis. By way of example only and not by way of limitation, such as in the exemplary embodiment where the central processor apparatus is a laptop computer, the keyboard can be utilized by a recipient to input such input. Alternatively, and/or in addition to this, a graphical user interface can be utilized in combination with a mouse or the like and/or a touchscreen system so as to input the input pertaining to the particular feature of the given hearing prostheses. In an exemplary embodiment, the central processor apparatus is also configured to collectively evaluate the input from the plurality of sound capture devices and the input pertaining to the particular feature of the given hearing prosthesis to identify the at least one spatial location that is more conducive to hearing with the particular hearing prosthesis relative to another spatial location. In this regard, by way of example only and not by way of limitation, in an exemplary embodiment, the input pertaining to a particular feature of a given hearing prostheses can be the current gain setting of the hearing prosthesis or otherwise the gain setting of the recipient intends to utilize during the hearing event. In an exemplary embodiment, upon receiving this input, the central processor apparatus utilizes, by way of example only and not by way of limitation, in lookup table that includes in one section data relating to the particular feature of the given hearing prosthesis, and in a correlated section, data associated there with that is utilized in conjunction with the inputs from the plurality of sound capture devices are developed, utilizing an algorithm, such as an if else algorithm, that identifies at least one spatial location that is more conducive to hearing with the particular hearing prosthesis relative to one or more other spatial locations.

In an exemplary embodiment, the spatial location that is identified can be specific to an identifiable location. By way of example only and not by way of limitation, with respect to the embodiment of FIG. 5, one or more particular seats can be identified (e.g., seat 5, row 2, etc.). Alternatively, and/or in addition to this, a more generic location can be identified, such as the identification utilizing Cartesian, polar, cylindrical and/or spherical coordinate systems, which can be relative to a known location, such as a location of one or more the microphones, the location of the stage 85, the location of the central processor apparatus, etc.

Consistent with the teachings above, as will be understood, in an exemplary embodiment, the system can further include a plurality of microphones spatially located apart from one another. In an exemplary embodiment, one or more or all of the microphones or located less than, more than or about equal to X meters apart from one another, where, in some embodiments, X is 0.5, 0.75, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 70, 80, 90, 100, 110, 120, 130, 140, 150, 175, 200, or more or any value or range of values therebetween in 0.01 increments (e.g., 4.44, 45.59, 33.33 to 36.77, etc.).

In an exemplary embodiment, consistent with the teachings above, the microphones are configured to output respective signals indicative of respective captured sounds. The system is further configured to provide the respective signals and/or modified signals based on the respective signals to the central processor apparatus as input from the plurality of sound capture devices.

Figure 6:
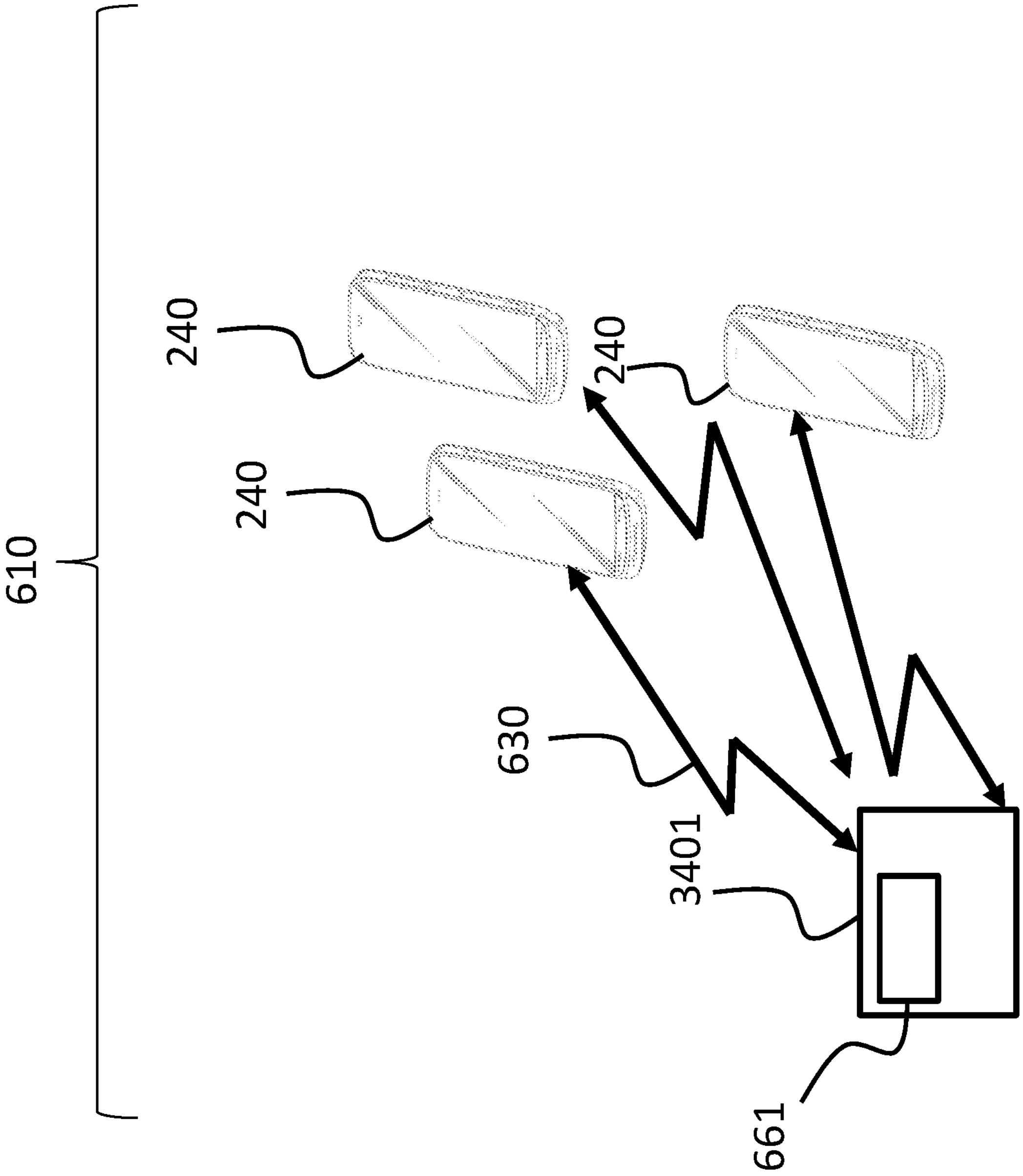
FIGS. 6 to 7B present exemplary systems according to exemplary embodiments.

Consistent with the teachings above, such as system 310 of FIG. 3, or system 610 of FIG. 6, where various separate smart phones 240 or other types of consumer electronics products that include a microphone or in signal communication with the central processor apparatus 3401 via respective links 630, in an exemplary embodiment, the microphones of a given system can be microphones that are respectively part of respective products having utility beyond that for use with the system. By way of example only and not by way of limitation, in an exemplary embodiment, the microphones can be microphones that are parts of household devices (e.g., an interactive system such as Alexa, etc.), or respective microphones that are parts of respective computers located spatially throughout the house (and, in some embodiments, the microphones can correspond to the speakers that are utilized in reverse, such as speakers of televisions and/or of stereo systems) that are located in a given house at locations known to the central processor apparatus (relative or actual), and/or can be parts other components of an institutional building (school, theater, church, etc.). Still, consistent with the embodiment of FIG. 6, the microphones can be respective parts of respective cellular phones. In this exemplary embodiment, by way of example only and not by way of limitation, the microphones can be part of an Internet of Things.

In an exemplary embodiment, the cellular systems of the cellular phones 240 can be utilized to pinpoint or otherwise determine the relative location and/or the actual locations of the given cell phones, and thus can determine the relative locations and/or actual locations of the given microphones of the system. Such can have utilitarian value with respect to embodiments where the people who own or otherwise possess the respective cell phones will move around or otherwise not be in a static position or otherwise will not be located in a predetermined location. That said, in some exemplary embodiments, there will be a seating regime or the like (e.g., assigned seating at a theater, assigned seating in a classroom, etc.), and thus the system can be configured to correlate the identification of a given sound capture device with a given location that is or should be associated with that sound capture device (e.g., in an exemplary embodiment, the input that is received from the various sound capture devices includes identification tags of the like or some other marker that enables the central processor apparatus to correlate, such as by utilizing a lookup table that is programmed or otherwise present in the memory of the central processor apparatus, a given input with a given person and/or a given location—for example, if the input is from John A's cell phone, and it is noted that John A is sitting at a given location, that can be utilized to determine the spatial location of the sound capture device—for example, if the input includes a carrier or the like that indicates coordinates of the cell phone obtained via triangulation of cell phone towers etc., that can be the way that the system determines the location of the respective sound capture device that provided the given input).

In an exemplary embodiment, the embodiment of FIG. 6 utilizes a Bluetooth or the like communication system. Alternatively, and/or in addition to this, a cellular phone system can be utilized. In this regard, the link 630 may not necessarily be a direct link. Instead, by way of example only and not by way of limitation, the link can extend through a cellular phone tower where cellular phone system or the like. Of course, in some embodiments, the link can extend through a server or the like such as where the central processor apparatus is located remotely geographically speaking from the structure that creates the environment, which structure contains the sound capture device.

Still further, in at least some exemplary embodiments, the sound capture devices can be the microphones of the hearing prosthesis of given persons, where correlations can be made between the inputs there from according to the teachings herein and/or other methods of determining location. Again, as noted above, the sounds captured can be from the microphones of the hearing prostheses, and in some embodiments, a reverse telecoil system can be used to provide the sound captured to the system. That said, in some embodiments, the hearing prostheses can be configured to evaluate the sound and provide evaluation data based on the sound so that the system can operate based on the evaluation. For example, as with the smart phones, etc., the hearing prosthesis can include and be configured to run any of the programs for analyzing sound detailed herein or variations thereof, to extract information from the sound. Indeed, in an exemplary embodiment, the sound processors of the prostheses without modification are configured to do this (e.g., via their beamforming and/or noise cancellation routines), and the prostheses are configured to output data from the sound processor that otherwise would not be outputted that is indicative of features of the sound.

It is noted that while in some embodiments, the teachings herein can be applied generically to all different types of hearing prostheses, in other embodiments, the teachings detailed herein are specific to a given hearing prostheses. In general, in at least some exemplary embodiments, the determination of location(s) by the system can be based on the specific type of hearing prosthesis that is being utilized for a given recipient. By way of example only and not by way of limitation, in some exemplary embodiments, the system is configured to identify a utilitarian location that more utilitarian for cochlear implant users than for conventional hearing aid users and/or for bone conduction device users, and/or in some embodiments, the system is configured to identify the utilitarian location that is more utilitarian for a hearing prosthesis user that is not a cochlear implant user, such as by way of example only and not by way of limitation, a conventional hearing aid user and/or a bone conduction device user.

Accordingly, in an exemplary embodiment, the hearing prosthesis that is the subject of the above system is cochlear implant, and the system is configured to collectively evaluate the input from the plurality of sound capture devices to identify at least one spatial location that is more conducive to hearing with the cochlear implant relative to another spatial location and relative to that which would be the case for another type of hearing prosthesis. In an exemplary embodiment, the system can utilize a lookup table or the like that is programmed into memory, which lookup table has data points in one section respectively associated with various hearing prostheses, such as the hearing prostheses at issue, and has another section correlated to various weighting factors or the like to weight the results of the analysis of the various signals received from microphones so as to identify the given location that has utilitarian value.

In an exemplary embodiment, the system is configured to receive input indicative of a specific recipient of the hearing prosthesis' hearing profile. This can include features that are associated with the hearing prosthesis and/or can be completely independent of the hearing prostheses. In this exemplary embodiment, the central processor apparatus is configured to collectively evaluate the input from the plurality of sound capture devices and the input indicative of the specific recipient to identify the at least one spatial location that is more conducive to hearing with the particular hearing prosthesis relative to another spatial location.

FIG. 6 further includes a feature of the display 661 that is part of the central processor apparatus 3401. That said, in an alternative embodiment, the display can be remote or otherwise be a separate component from the central processor apparatus 3401. Indeed, in an exemplary embodiment, the display can be the display on the smart phones or otherwise the cell phones 240. Thus, in an exemplary embodiment, the system further includes a display apparatus configured to provide data indicative of the identified at least one spatial location that is more conducive to hearing with a hearing prosthesis relative to another spatial location. By way of example only and not by way of limitation, the display can output a name or another indicator associated with a recipient of a hearing prosthesis along with information pertaining to where that person should locate himself or herself to take advantage of the aforementioned location that is more conducive to hearing. In an exemplary embodiment, the system further includes a display apparatus configured to provide landscape data indicative of the identified at least one spatial location that is more conducive to hearing with a hearing prosthesis relative to another spatial location. By way of example only and not by way of limitation, in an exemplary embodiment, the landscape can correspond to a map or the like of a given location, such as the seating arrangements depicted in FIG. 5, where an X or the like is overlaid over the given seat that corresponds to the spatial location that is more conducive to hearing. Alternatively, and/or in addition to this, a circle or a square or the like can be overlaid over the seat or seats that corresponds to the given location, with the seats can be highlighted somehow (colored red), etc. A topographical map of a given area can be presented as a landscape.

It is noted that while the embodiments detailed herein depict two-way links between the various components, in some embodiments, the link is only a one way link. By way of example only and not by way of limitation, in an exemplary embodiment, the central processor apparatus can only receive input from the smart phones, but cannot output such input thereto.

Figure 7A:
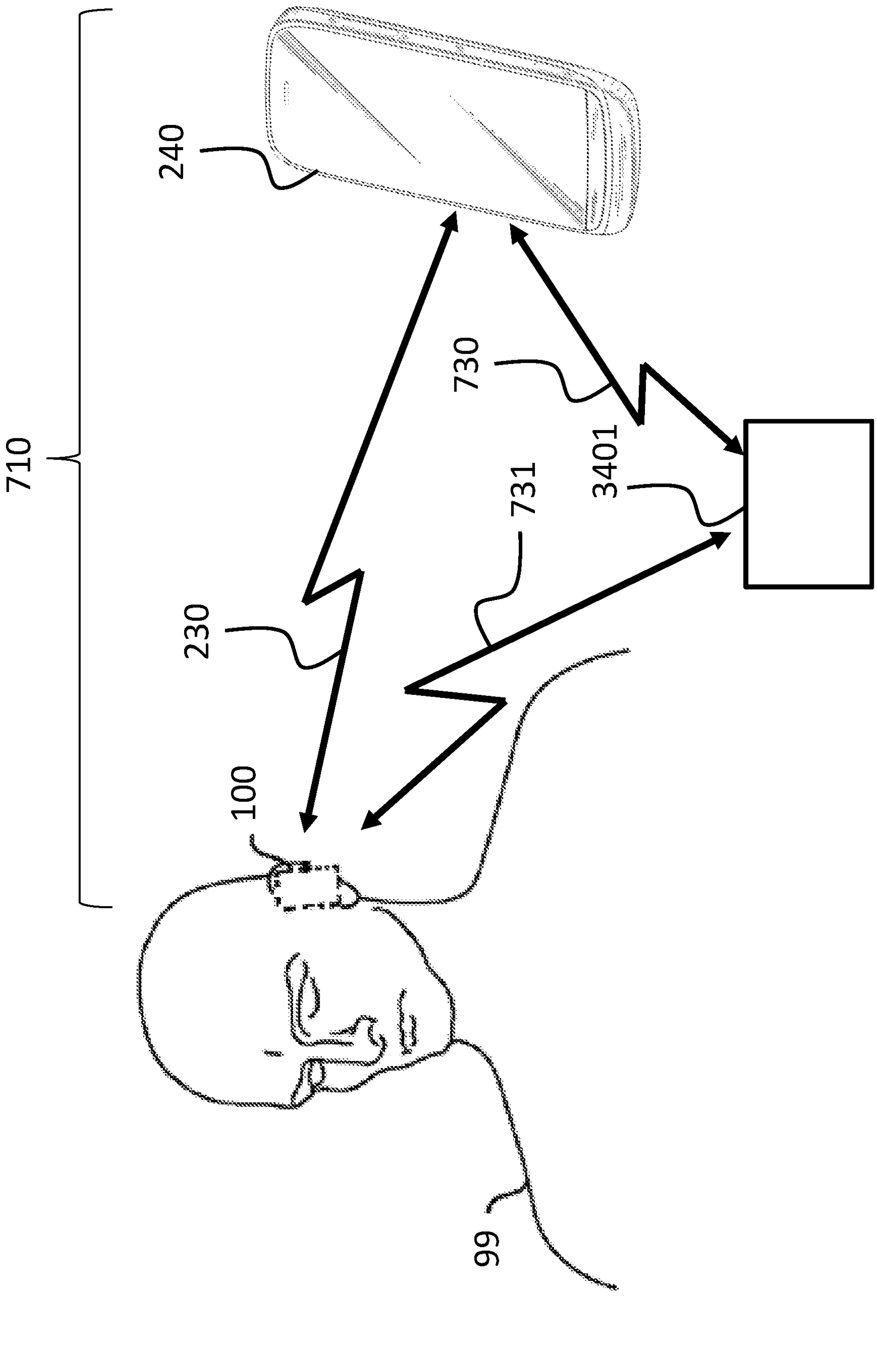
FIG. 7C depicts an exemplary map.

It is noted that while the embodiments of FIGS. 3-6 have focused on communication between the sound capture devices and the central processing assembly or communication between the sound capture devices and the hearing prostheses, embodiments further include communication between the central processing assembly and the prostheses. By way of example only and not by way of limitation, FIG. 7A depicts an exemplary system, system 710, which includes link 730 between the sound capture device 240 with the microphone (which here can correspond to the cell phone, but in some alternate embodiments, can correspond to the microphones that are dedicated to the system, etc.) and the central processing assembly 3401. Further, FIG. 7A depicts link 731 between the central processor apparatus 3401 and the prosthesis 100. The ramifications of this will be described in greater detail below. However, in an exemplary embodiment, the central processor apparatus 3401 is configured to provide, via wireless link 730, an RF signal and/or an IR signal to the prosthesis 100 indicating the spatial location that is more conducive to hearing. In an exemplary embodiment, the prosthesis 100 is configured to provide an indication to the recipient indicative of such. In an exemplary embodiment, the hearing prosthesis 100 is configured to evoke an artificial hearing percept based on the received input. In an exemplary embodiment, the prostheses can evoke an artificial hearing percept that verbally instructs the recipient where to position himself or herself to take advantage of the spatial location that is more conducive to hearing. As will be detailed elsewhere, the prosthesis can evoke another type of sensory percept that will provide such instructions (e.g., visual, such as with text, etc.).

Figure 7B:
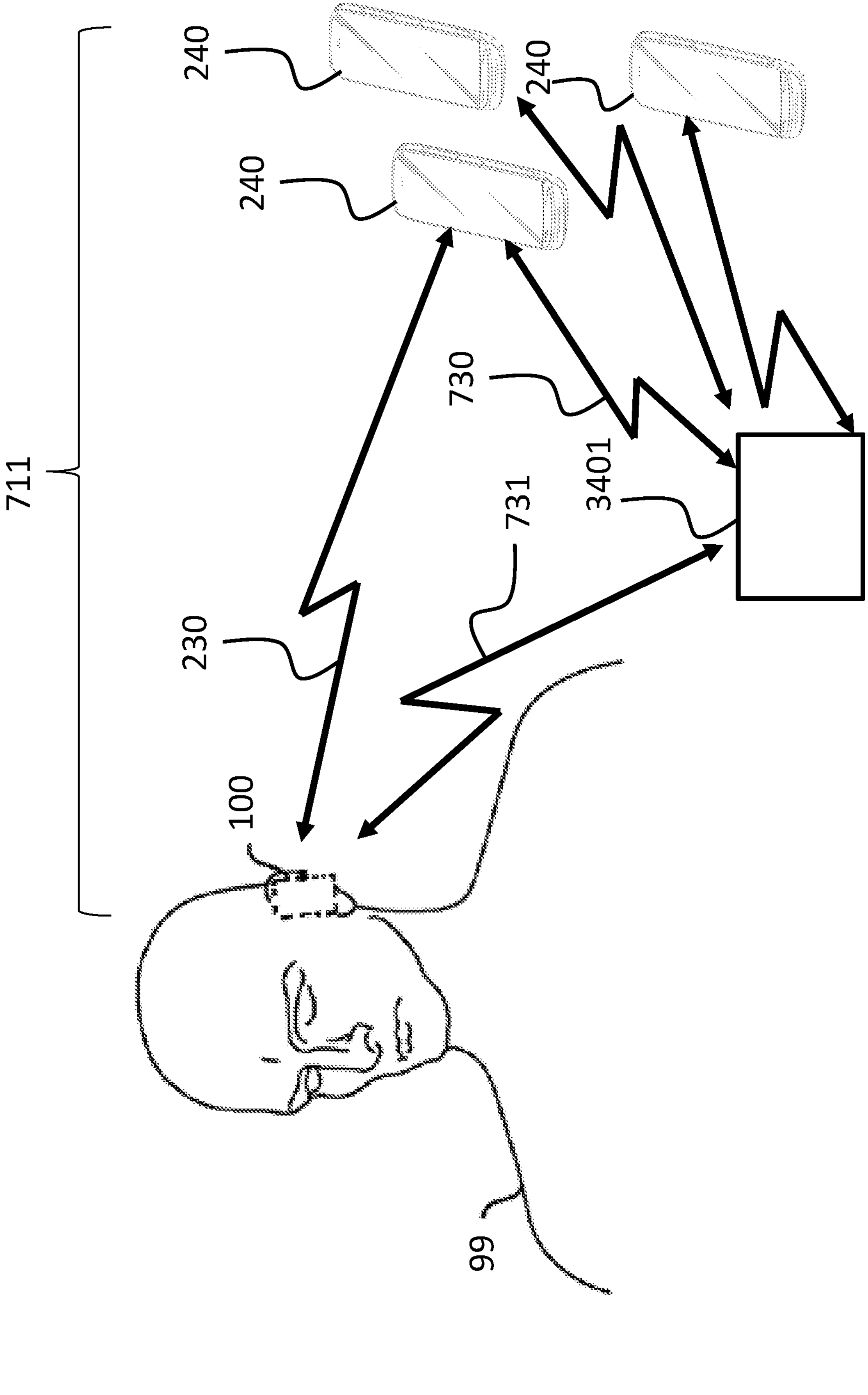

FIG. 7B presents a system 711 that corresponds to the system 710 detailed above, but is representative of a plurality sound capture devices in general, which can be an Internet of Things in at least some exemplary embodiments.

In view of the above, it is understood that in an exemplary embodiment, there is a system that is configured to locate an optimal hearing spot/point/location/area for the recipient. In an exemplary embodiment, this is the optimal hearing spot/point/location/area, and in other embodiments, is one of a plurality of such. In this embodiment, sound capture devices, such as microphones, are located in an environment, which form a network in which the sound capture devices receive and, in some embodiments analyze, the surrounding (local) acoustic signal that enables the relative location of a source (high/low level, intensive/less intensive, etc.) of noise signals or other signals of interest. The system is configured to analyze the microphone signals that are received or otherwise divided from the various devices, and use this information to form one-dimensional, two-dimensional and/or three-dimensional sound field of the environment in which the sound capture devices are located. This could be done by knowing the location of each microphone in the network, and then analyzing the gains and/or phases of the various components in the output of the sound capture devices (the audio content that is captured). This is done, in an exemplary embodiment, in real-time, while in other embodiments, it is not done in real time. In an exemplary embodiment, the system is configured to receive a recipient's hearing profile as part of the criteria for locating and deciding whether the selected acoustic spot/zone would be utilitarian (e.g., ideal) for a given particular individual.

In at least some embodiments, the system is configured to take into account the presence of the objects located in the environment, based on the analyzed relative acoustic signals, and can display or otherwise provide the overall acoustic landscape/sound-field of the environment. In an exemplary embodiment, this is done by providing such directly and individually to the recipient of the prosthesis, such as by way of example only and not by way of limitation, via Google Glasses and/or the smart phone display, etc. In an exemplary embodiment, this can have utilitarian value with respect to providing this information discreetly to the recipient of the prostheses. Any device, system, and/or method that will enable the action of providing information to the recipient, whether such is tailored specifically to the recipient or is general to someone who utilizes a hearing prosthesis, can be utilized in at least some embodiments. Indeed, in an exemplary embodiment, a display is provided at an entrance of the like to an auditorium, which display indicates areas that have utilitarian value with respect to providing a better hearing experience for a given recipient and/or for a general recipient of a hearing prosthesis relative to other areas. Still, consistent with the embodiment that utilizes the smart phone or the like (as represented by the two-way link), the system can provide an interactive communication with the recipient indicate the location that has the better and/or best acoustic environment, which, in some embodiments, is matched to the individual's hearing profile and/or specific needs.

In an exemplary scenario, where a plurality of microphones are present in a given environment, an acoustic landscape of a theater and/or a concert hall, sport's arena, church, auditorium, etc., can be analyzed. The respective microphones of the respective sound capture devices can, for example, be utilized to obtain information indicative of the approximate level of noise at the location thereof. In an exemplary embodiment, this is done by simply capturing sound and then streaming the sound and/or a modified version of the signal thereof to the central processing assembly. In an exemplary embodiment, this is done by utilizing the remote specific devices (e.g. smart phone) to analyze the sound, such as by way of example only and not by way of limitation, utilizing an application thereof/stored thereon to determine a given sound level and/or noise level at that location, and then the respective devices can output a signal to the central processor apparatus indicative of the noise level local to the sound capture device. In some embodiments, the audio data is analyzed in real time, while in other embodiments, it is not so analyzed.

Figure 7C:
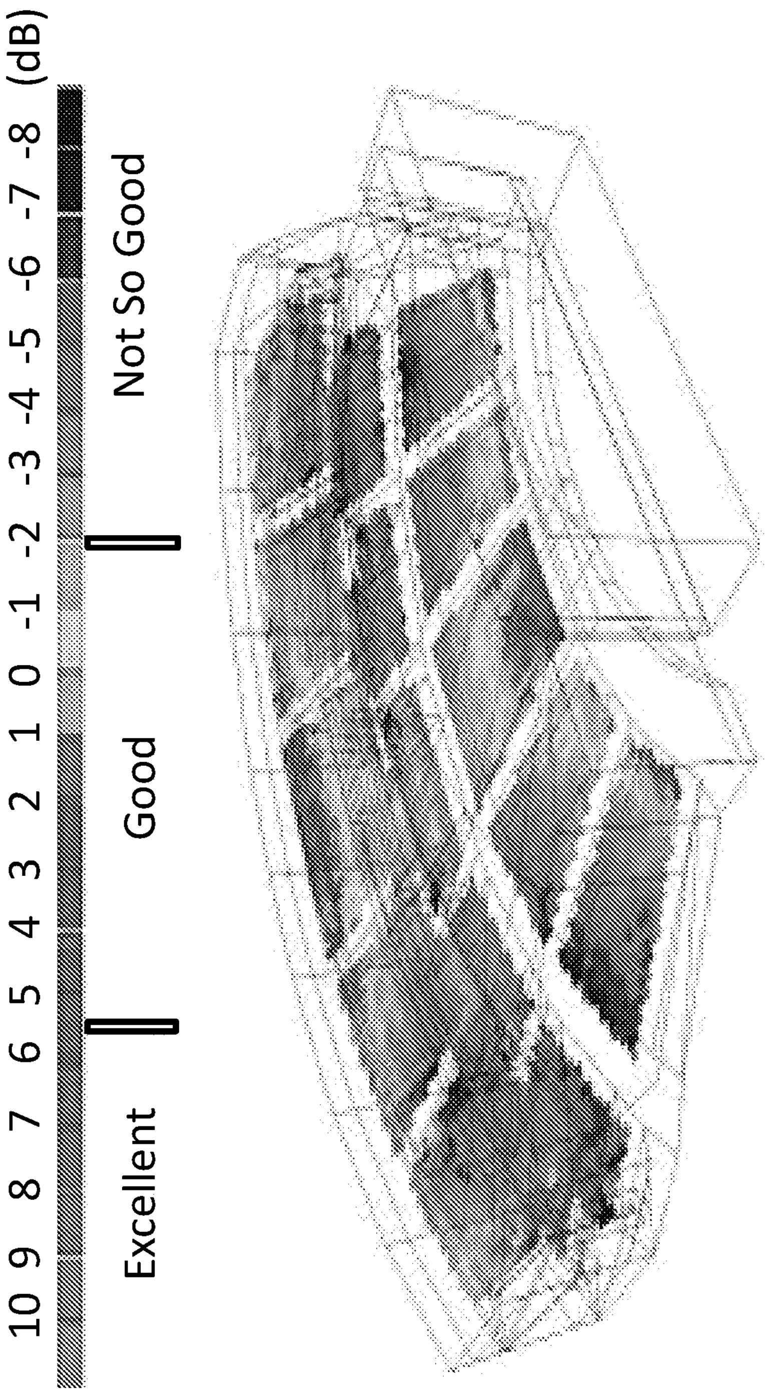

In an exemplary embodiment, such as when the sound capture devices are formed in a network, such can be used/is used to provide a relative signal to noise level across the entire room/enclosed volume. Depending on the nature of the volume and/or how objects therein are arranged, an overall acoustic landscape and/or sound-field can be developed, where several spots are considered excellent or good while the other territory is considered relatively inferior. FIG. 7C presents such an exemplary landscape. In an exemplary embodiment, a recipient of the hearing prosthesis can gaze upon the depicted landscape, which can be presented on the recipient's cellular phone or the like, and identify based thereon where he or she should sit. In an exemplary embodiment, by way of example only and not by way of limitation, such can be done in real time, such as after say 75% or 80% or 90% of the people in attendance have taken their seats, such that the depicted landscape is closely correlated to what will be the actual landscape within the room with people in attendance. Alternatively, in an exemplary embodiment, by way of example only and not by way of limitation, the data utilized to develop the aforementioned landscapes can be developed previously, such as with respect to that which was the case in a prior use of the given volume (e.g., a prior concert with numbers of people in attendance statistically similar to that which would be the case in present time). Indeed, in an exemplary embodiment, the data can be developed over a series of usages of the enclosed volume, and a given sound landscape can be selected that is most related to a current situation that exists in the enclosed volume (e.g., number of people, temperature inside, type of music being played, etc.).

In an exemplary embodiment, the signal to noise ratios that are utilized to evaluate the captured sound are based on the fact that it is known what is being focused on and/or what the sound is classified as. In an exemplary embodiment, clips of sound can be utilized as a basis for the evaluation. That is, the captured sound can be captured in clips, or otherwise the captured sound can be reduced into clips, whereupon the clips are evaluated.

Figure 8:
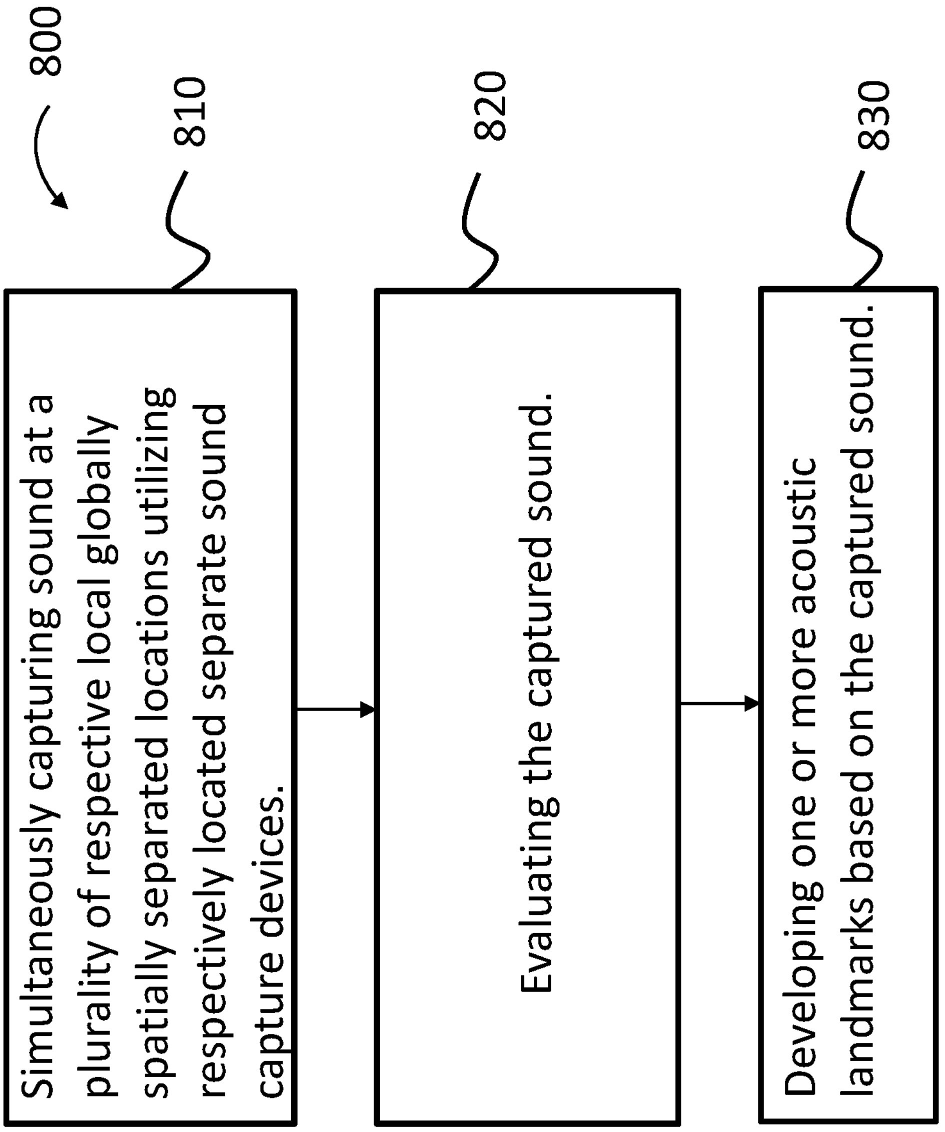
FIGS. 8 to 17 present exemplary flowcharts for exemplary methods.

FIG. 8 presents an exemplary flowchart for an exemplary method, method 800, according to an exemplary embodiment. Method 800 includes the action of simultaneously capturing sound of the plurality of respective local globally spatially separated locations utilizing respectively located separate sound capture devices. By "locally globally spatially separated locations," it is meant that for a given location (the local location), the locations are separated in a global manner. This as opposed to, for example, a plurality of microphones on a conference room teleconference device, which are all clustered together in one component. These would be locally spatially separated locations. By global, it is meant, if a given sound environment were the earth, the locations would be globally different (e.g., New York and Chicago are globally spatially separated, New York and Newark NJ would not be so considered). The point is, this is something more than merely two microphones that do not inhabit the same space.

Method 800 further includes method action 820, which includes evaluating the captured sounds. By way of example only and not by way of limitation, such can correspond to comparing a noise level in a first sound to a noise level in a second sound. Still further by way of example, such can correspond to comparing a phase of the first captured sound and a phase of the second captured sound. In an exemplary embodiment, the decibel level of the output signals can be compared to one another. In an exemplary embodiment, as will be described in greater detail below, the signals can be analyzed for reverberant sound. Note further that other exemplary comparisons can be utilized. Note also that in at least some exemplary embodiments, method action 820 need not rely on or otherwise utilize comparison techniques. Any type of evaluation can be executed to enable the teachings detailed herein.

In an exemplary embodiment, the action of evaluating the captured sound and method action 820 includes comparing respective gains of the captured sound and/or comparing respective phases of the captured sound.

In an exemplary embodiment, any Real-Time Audio Analyzer that is commercially available can be used or otherwise adapted for the system, such as Keysight or Rohde & Schwarz multi-channel audio analyzers. Any device that is configured to perform real-time analysis of multi-channel audio signals in the time and frequency domain can be used, such as the RSA7100A Real-Time Spectrum Analyzer or the Keysight X-Series Signal Analyzers. In an exemplary embodiment, processing is done by a computer, and the microphone inputs could be sampled and digitized, and provided to the computer, where a software package that exists for audio analysis, is stored thereon, such as Audacity, and the software package analyzes such.

Method 800 further includes method action 830, which includes developing one or more acoustic landmarks based on the captured sound. By way of example only and not by way of limitation, an acoustic landmark can correspond to a location of relative high background noise, a location of relative low background noise, a location of relative synchronization of phases of the sound at a given location, a location relative non-synchronization of phases of sound at a given location, etc. Note that there can be a plurality of acoustic landmarks. In an exemplary embodiment, the action of developing one or more acoustic landmarks in method action 830 can include the action of utilizing known locations of the respective sound capture devices relative to a fixed location and/or relative to one another in combination with the evaluated captured sound to develop weighted locations weighted relative to sound quality. In an exemplary embodiment, the action of developing one or more acoustic landmarks includes the action of evaluating the evaluated captured sound in view of data particular to a hearing related feature of a particular recipient of a hearing prosthesis (e.g., Jane B., Robert C., or a generic individual, such as Ticket Holder for Seat 333, etc.). By way of example only and not by way of limitation, in an exemplary embodiment, the data particular to a hearing related feature of a particular recipient can correspond to the recipient's inability to hear high frequency and/or middle frequencies and/or the inability to hear sounds below a certain decibel level. Still further, method action 830 can include identifying a location conducive to hearing ambient sound originating in the vicinity of the sound capture devices based on the evaluation of the evaluated captured sound evaluated in view of the data indicative of the recipient of a hearing prosthesis.

In view of the above, in an exemplary embodiment, the results of method 800 can be different for different individuals, such as individuals who utilize the same type of hearing prosthesis (cochlear implant, middle ear implant or bone conduction device) and/or the result of method 800 can be different for different individuals who utilize different types of hearing prostheses.

In an exemplary embodiment, method action 830 includes developing one or more acoustic landmarks by determining a spatial location where there is minimal noise and/or reverberation interference relative to another spatial location based on the evaluation of the captured sound.

Figure 9:
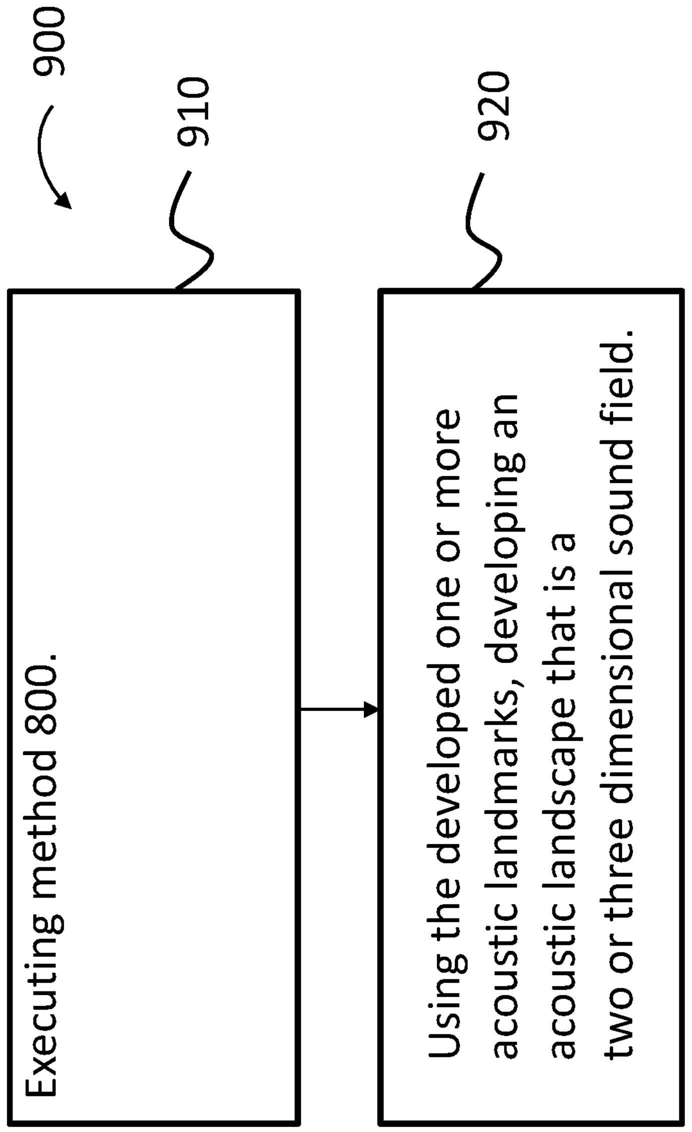

FIG. 9 presents an exemplary method, method 900, that includes method action 910, which includes executing method 800. Method 900 further includes method action 920, which includes the action of utilizing the developed one or more acoustic landmarks to develop an acoustic landscape that is a two-dimensional or three-dimensional sound field. In an exemplary embodiment, the developed sound field can correspond to that presented in FIG. 7C.

Consistent with the specific teachings herein, in an exemplary embodiment, the acoustic landmark(s) developed in method action 830 can be geographical location(s) at which a cochlear implant recipient will have a more realistic hearing percept relative to other geographic locations. Consistent with the concept of utilizing a global approach, the geographic locations are geographic locations of the local area.

Figure 10:
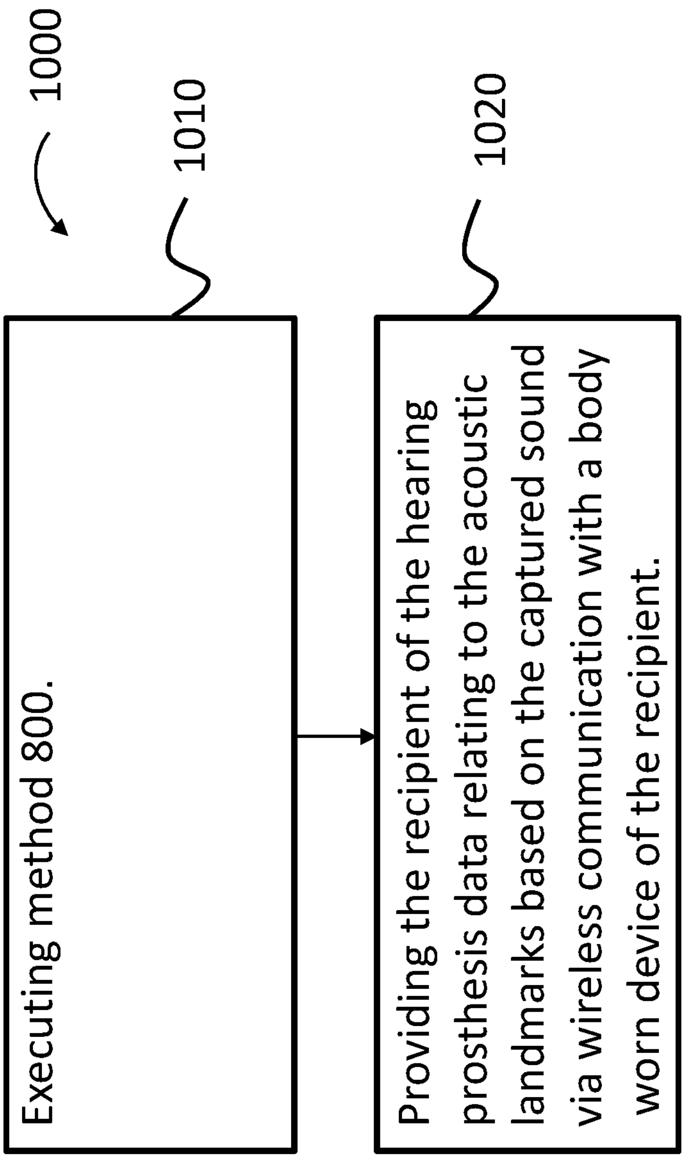

FIG. 10 presents an exemplary flowchart for an exemplary method, method 1000, according to an exemplary embodiment. Method 1000 includes method action 1010, which includes executing method 800. Method 1000 also includes method action 1020, which includes the action of providing the recipient of the hearing prosthesis data relating to the acoustic landmarks based on the captured sound via wireless communication with a body carried device of the recipient, such as by way of example only and not by way of limitation, a body worn device of the recipient (e.g., the prosthesis, a smart watch, etc.).

Figure 11:
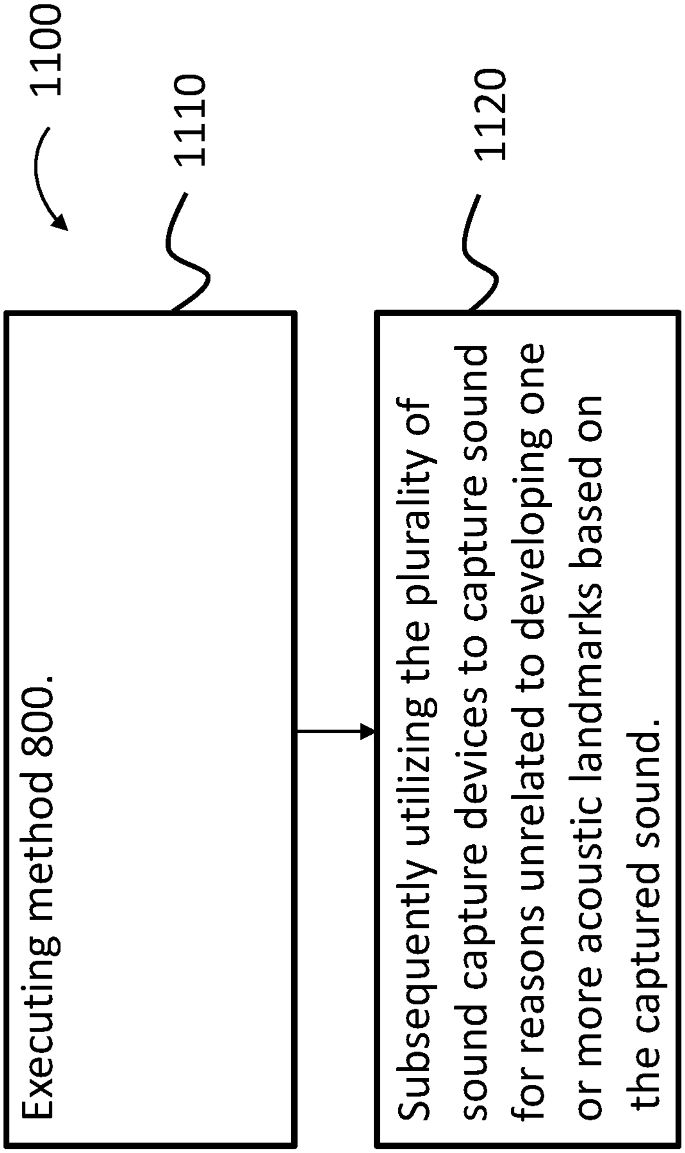

FIG. 11 presents an exemplary flowchart for an exemplary method, method 1100. Method 1100 includes method action 1110, which includes executing method 800. Method 1100 further includes method action 1120, which includes subsequently utilizing the plurality of sound capture devices to capture sound for reasons unrelated to developing one or more acoustic landmarks based on the captured sound. By way of example only and not by way of limitation, in an exemplary scenario where the sound capture devices are microphones of smart phones or cell phones, in an exemplary embodiment, after method action 830 is executed, at some point in the future, the microphones of the cell phones are utilized for cell phone communication. Still further by way of example only and not by way of limitation, in an exemplary scenario where the sound capture devices are the microphones of landline phones, where method 800 was executed by taking the landline phones "off the hook" and laying the handheld component facing upward (where, in an exemplary embodiment, a remote device can record given sounds captured thereby, such as by way of example only and not by way of limitation, a device located in Los Angeles where the enclosed volume where the phones are present is located in Washington, D.C.), method action 1120 includes the action of utilizing those phones to make a landline based telephone call. Still further, such as where the speakers of televisions are utilized in reverse to capture sound, method action 1120 further includes utilizing the speakers to watch television. It is noted that while the above is presented in terms of executing method 1120 after method action 830 (and method actions 820 and 810), in an exemplary embodiment, method 1120 is executed prior to executing any of method actions 810, 820 and 830. Also, in an exemplary embodiment, method action 1120 is executed both before and after the method actions of method 800.

Figure 12:
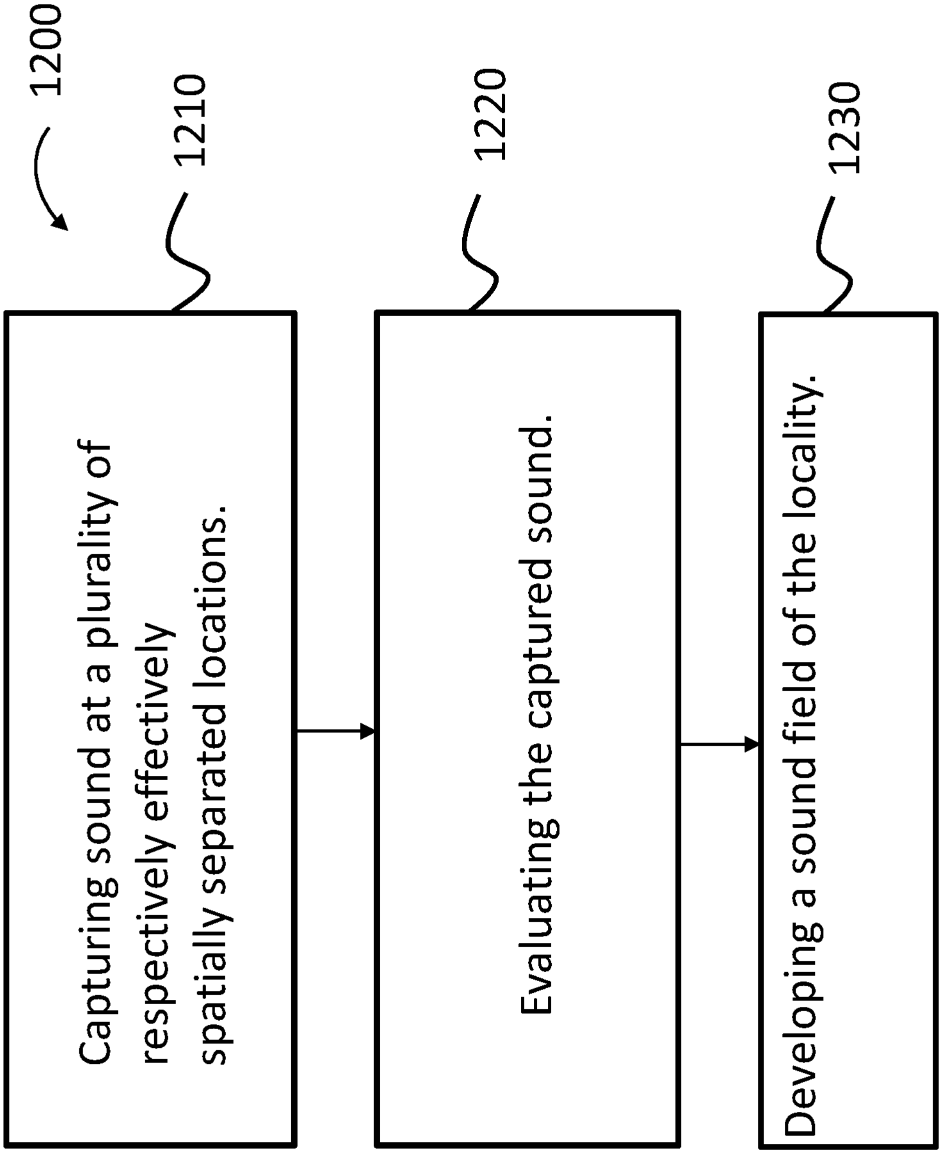

FIG. 12 presents an exemplary flowchart for an exemplary method, method 1200, which includes method action 1210 which includes capturing sound of the plurality of respectively effectively spatially separated location. By effectively spatially separated locations, it is meant that the locations are sufficiently separated that capturing sound at those locations will have utilitarian value with respect to implementing the method (e.g., locations as close as, say, an inch or so will likely not have any utilitarian value with respect to implementing the method). Method 1200 further includes method action 1220, which includes evaluating the captured sound. This can be done in accordance with any of the teachings detailed herein and/or variations thereof, and/or with respect to any other manner which can have utilitarian value with respect to implementing the teachings detailed herein. By way of example only and not by way of limitation, in an exemplary embodiment, the action of evaluating the evaluated captured sound can be based on signal to noise ratios of a microphone and/or a plurality of microphones.

It is briefly noted that unlike method 800 above, the action of capturing sound need not be executed simultaneously. By way of example only and not by way of limitation, in an exemplary embodiment, method 1200 can be executed utilizing a microphone, such as the same microphone, and moving the microphone from location to location over a period of time. This as opposed to method 800, where a plurality of microphones are utilized to capture sound at the exact same time.

Method 1200 further includes method action 1230, which includes developing a sound field of the locality. In an exemplary embodiment, the developed sound field can correspond to that depicted in FIG. 7C, and thus, in an exemplary embodiment, the sound field can be a three-dimensional sound field. In an exemplary embodiment, the sound field can be two-dimensional or even one-dimensional. Moreover, in an exemplary embodiment, the sound field can correspond to a matrix or the like of locations and respective data points associated therewith. In an exemplary embodiment, the action of developing the sound field includes evaluating the evaluated captured sound that was captured in method action 1210 in view of data particular to a hearing related feature of a particular recipient of a hearing prosthesis. In this exemplary embodiment, by way of example only and not by way of limitation, such can correspond to identifying where first frequencies are better heard relative to other second frequencies, where the recipient has documented or otherwise known relative superior hearing at the first frequencies relative to the second frequencies. Still further, in this exemplary embodiment, by way of example and not by way of limitation, the data particular to a hearing related feature of a particular recipient of a hearing prosthesis is the ear with which the recipient hears better. Thus, in view of the above, in an exemplary embodiment, the teachings detailed herein can be utilized to fine tune an analyzed acoustic landscape for a given individual. By way of example, based on the recipient's hearing profile, it may be known that the recipient may not have a good dynamic hearing perception on a certain sound level or a particular frequency. Taking account of this information, an optimal spot or otherwise the utilitarian spot could be recommended to this particular individual. A further example could be to characterize the relevant reverberation levels at different points around the room or other enclosed volume. Utilizing this information, better locations and/or better listening spots can be recommended to a specific individual.

Alternatively, and/or in addition to this, consistent with the teachings detailed above, in an exemplary embodiment, the action of developing the sound field of the locality can include the action of evaluating the evaluated captured sound in view of statistical data relating to cochlear implant users. In this regard, there is data available and/or there is data that can be developed over a statistically significant group of cochlear implant users that can enable statistically significant factors to be deduced based there from. In this regard, the sound field of the locality can be developed so as to identify locations that are conducive or otherwise favorable to improving the hearing experience of a statistically normal cochlear implant user. By way of example only and not by way of limitation, it is known that cochlear implants have an electrical sound/synthesized sound. Some may consider the sound to be analogous to a breathless person speaking in a hushed manner. A location in the locality or a plurality of locations in the locality can be identified where the captured sound will be more compatible with the hearing percept evoked by a cochlear implant relative to other locations. By way of example only and not by way of limitation, a location where sounds are more pronounced and otherwise have little reverberant sound therein or otherwise minimize reverberant sound relative to other locations can be identified when developing the sound field of the locality. Of course, in some embodiments, the sound field of the locality can simply correspond to indicators that indicate that such a location is useful for a cochlear implant users. Of course, in some embodiments, the action of evaluating the captured sound can be executed in view of statistical data relating to other types of hearing implant recipients, such as, for example, a middle ear implant recipients and/or bone conduction recipients and/or normal conventional hearing aid recipients, etc. Moreover, in some embodiments, the action of evaluating the captured sound can be executed in view of statistical data related to a specific model or design of a given implant. By way of example only and not by way of limitation, in an exemplary embodiment, if the cochlear implant is a so-called small or short cochlear implant electrode array design configured to preserve residual hearing, the action of developing a sound field of the locality correspond to providing indicators of locations where a recipient utilizing such design and/or model will have a better hearing experience relative to other locations. Indeed, in an exemplary embodiment, the sound field can indicate locations for total electric hearing persons as well as for persons that have partial electric hearing in a given ear.

By way of example only and not by way of limitation, in an exemplary embodiment, features specific to an individual recipient that are utilized to develop the sound fields herein and/or to develop one or more acoustic landmarks herein, etc., can include a dynamic range function with respect to frequency, the given signal processing algorithm that is utilized for a particular recipient, or a feature thereof that is significant with respect to executing the methods detailed herein, an acoustic/electric hearing audiogram, whether or not the recipient is utilizing a noise cancellation algorithm with his or her hearing prosthesis, one or more or all of the variable settings of the prosthesis. It is also noted that the teachings detailed herein can be utilized in a dynamic manner with respect to changing recipient factors. By way of example only and not by way of limitation, in an exemplary embodiment, there can be a scenario where the recipient changes a setting or feature on his or her hearing prosthesis. In an exemplary embodiment, this could initiate a function of the system that provides an indication to the recipient that he or she should change a location or the like owing to this change in the setting. For example, in an exemplary embodiment, the teachings detailed herein are implemented based in part on a given setting or a given variable feature (variable within a sound environment period, such as during a concert, etc.). Accordingly, when such features change, the data developed that is specific to that recipient may no longer be correct and/or a better location may exist. The teachings detailed herein include an embodiment where, during a sound event, such as a concert, a movie, a classroom lesson, etc., something that has a discrete beginning and end, typically accompanied by movement of people in and/or out of an enclosed environment, something changes, which change results in a different utilitarian position for the recipient than that which was previously the case. In an exemplary embodiment, the teachings detailed herein include continuously or semi-continuously or otherwise periodically updating an acoustic landmark data set and/or an acoustic landscape, etc., and providing the recipient with the updated information, and/or which can include indicating to the recipient, automatically, or even manually, in some instances, that there are other locations that the recipient may find more utilitarian than that which was previously the case. In an alternate embodiment, a system could also suggest to the recipient to adjust the device settings, due to the change in the soundfield and/or utilize a knowledge of a change in the audio environment over a spatial region to trigger a device setting change.

To be clear, any of the teachings detailed herein can be executed 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 times or more during a given sound event. In this regard, in an exemplary embodiment, one or more or all of the methods are executed one of the aforementioned times during a given sound event.

Figure 13:
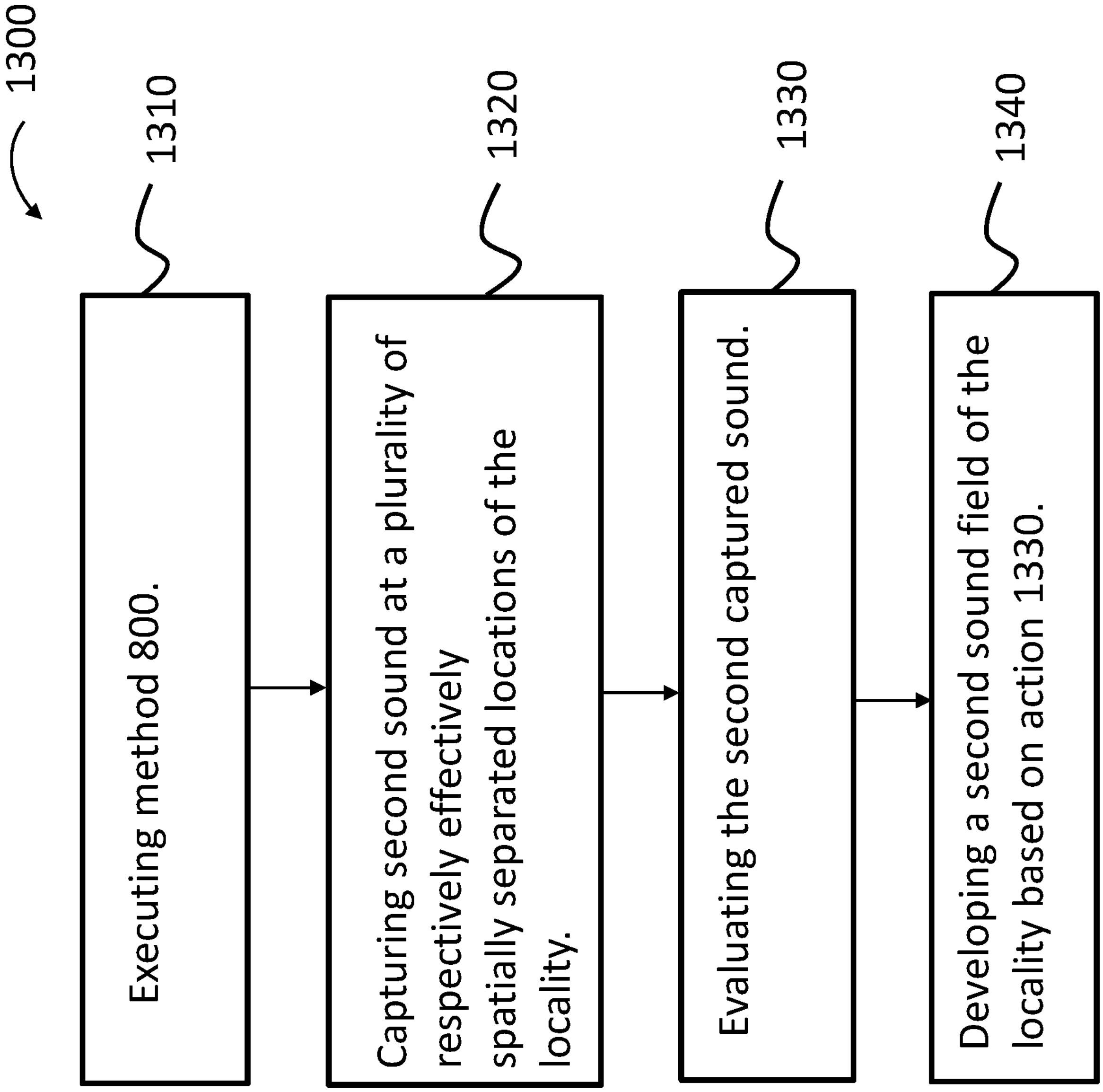

In at least some exemplary embodiments, it is noted that method action 800 can be repeated at different temporal locations and/or utilizing different spatial locations. In this regard, in an exemplary embodiment, FIG. 13 presents an exemplary flowchart for an exemplary method, method 1300, which includes method action 1310, which includes executing method 800. This results in the developed sound field being a first sound field of the locality. Method 1300 further includes method action 1320, which includes capturing second sound at a plurality of respective effectively spatially separate locations of the locality. In an exemplary embodiment, this action is executed less than, more than, and/or about X seconds, minutes, hours and/or days after executing method 800 and/or any one or more of the method actions of method 800. In this exemplary method, method 1300 further includes method action 1330, which includes evaluating the second captured sound. This can be executed according to any of the teachings detailed herein. Method 1300 further includes method action 1340, which includes developing a second sound field of the locality based on the action of evaluating the second captured sound. By way of example only and not by way of limitation, there can be utilitarian value with respect to practicing method 1300 in a scenario where, for example, the sound environment has changed, owing to the rearrangement of furniture, structure, and/or the movement of people into and/or out of a given enclosed volume, such as a room, a theater, a church, an auditorium, a concert hall, etc. Moreover, such can be a result of the change in temperature, a change in an HVAC system, a change in a location of sound sources and/or directionality of sound sources, the introduction of a noise source that previously was not present and/or the removal of a noise source that previously was present, etc. Indeed, in an exemplary embodiment of method 1300, there exists the scenario that in between the development of the first sound field and the development of the second sound field, the acoustic environment of the locality has effectively changed, which change can be a result of any one or more of the aforementioned scenarios. By "effectively changed," it is meant that an acoustic change has taken place that will have a noticeable impact or otherwise will have a statistically significant impact on a given recipient and/or a given population of recipients of hearing prostheses, etc.

Figure 14:
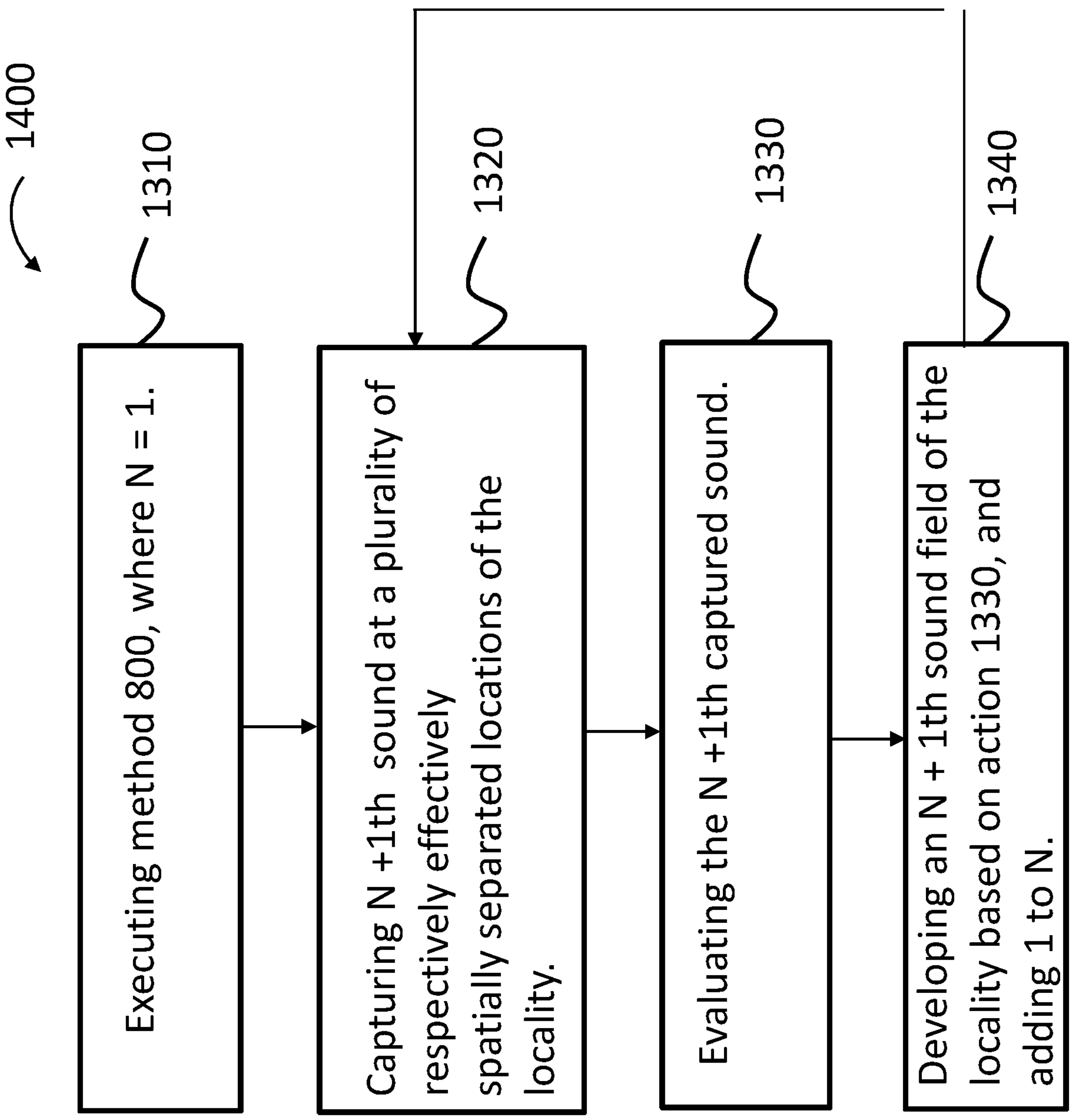

It is noted that in at least some exemplary embodiments, method 800 is repeated a number of times. In this regard, FIG. 14 presents an exemplary algorithm for an exemplary method, method 1400, which corresponds to method 1300, except with the indicators N and N+1 as can be seen. In this exemplary embodiment, method action 1310 is executed for a value of N=1, and then method action 1320 is executed for a value of N+1, and so on, until method action 1340 is reached, where one is added to the value of N, and the method returns back to method action 1320, where method action 1320 is executed for, if N=2, the $3^{rd}$ sound, etc.

In an exemplary embodiment of method 1300, the method further includes the action of identifying a recurring time period where, statistically, the sound environment is more conducive to a recipient of a hearing prosthesis relative to other time periods based on a comparison of at least the first and second sound fields (or Nth sound fields). In an exemplary embodiment, such an exemplary method can be utilized to determine when, for example, the best time or worse time to visit a restaurant or some other location for a given recipient of a hearing prosthesis and/or for a statistically normal member of a population of hearing prosthesis recipients. That is, beyond developing an overall acoustic landscape/sound field in accordance with the teachings detailed above, some embodiments of the teachings detailed take into the account of the dynamic changing acoustic environment of a given location over time. By way of example only and not by way of limitation, such as by utilizing the exemplary connectivity offered by a modern media platform, the teachings detailed herein can be utilized to provide an analyzed acoustic environment based on a multi-microphone system that is present in a given environment. Throughout the hours, days, and/or weeks, a general pattern and/or general patterns of the acoustic environment can be built up over time. This pattern and/or patterns can be utilized to determine when would be good and/or bad for the recipient to visit the given location. By way of example only and not by way of limitation, the patterns can indicate relative periods of low background noise, and thus the recipient can choose those periods of time to visit the restaurant so as to have a pleasant meal while engaging in a conversation with his and/or her friend so that it will be less demanding or otherwise fatiguing to understand or otherwise listen to the speaker because there will be less background noise during those periods of time. It is to be understood that in at least some exemplary embodiments, this can be combined with the other methods detailed herein so as to find both a good location to sit in the restaurant as well as to find a good time to visit the restaurant.

Note further that in at least some embodiments, this concept can be applied to a given locality so as to find a local location that is conducive to the hearing, which local location could potentially be time-based with respect to a pattern. By way of example only and not by way of limitation, with respect to the aforementioned restaurant example, it can be found that in some instances, during some time periods, it is better to sit at table 5 facing the door, and during other time periods, it is better to sit at table 4 or table 7 facing away from the door, while in other time periods there really just is no good place to sit.

Figure 15:
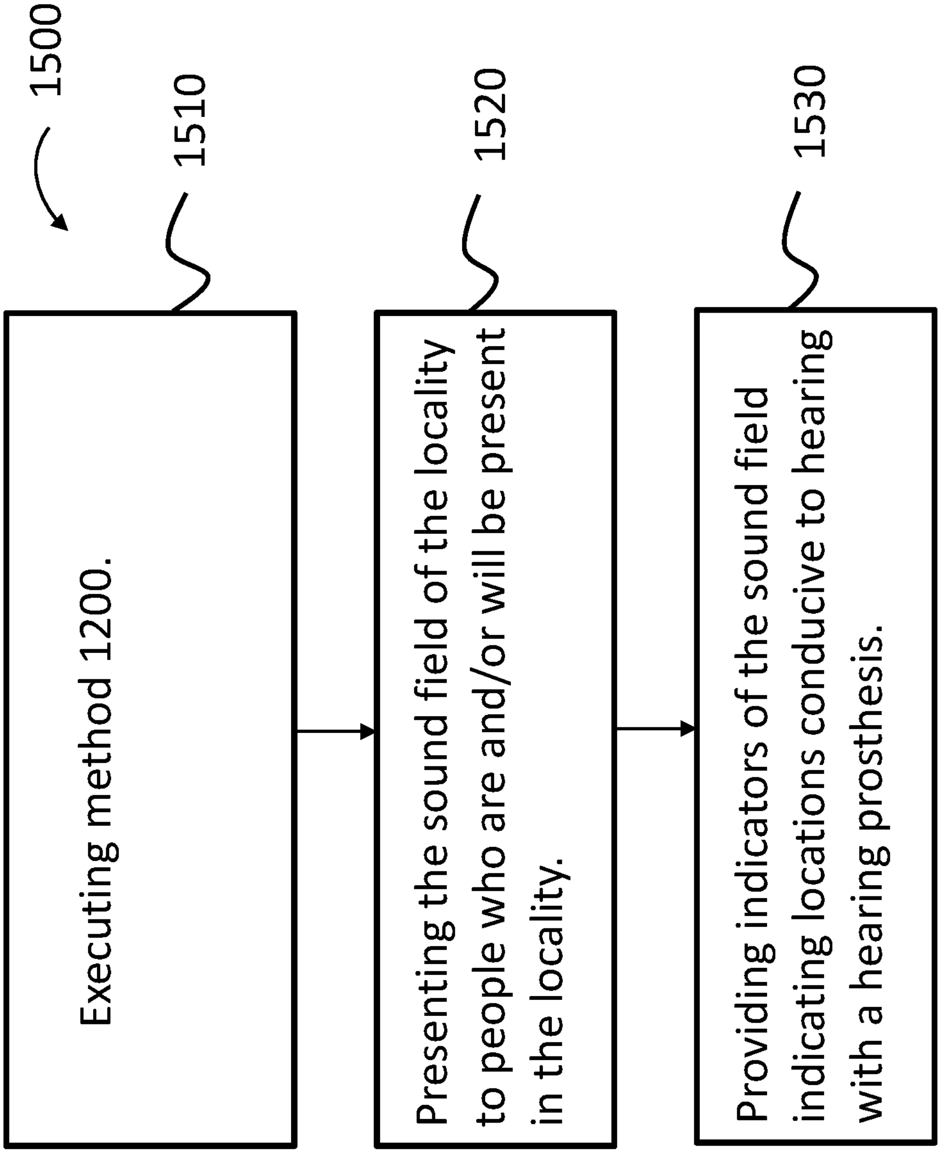

FIG. 15 depicts an exemplary method, method 1500, according to an exemplary embodiment. Method 1500 includes method action 1510, which includes executing method 1200. Method 1500 further includes method action 1520, which includes presenting the sound field of the locality to people who are and/or will be present in the locality. By way of example only and not by way of limitation, this can correspond to providing the sound field as a graphic that can be seen on the people's portable handheld consumer electronics device, such as the smart phone. In an exemplary embodiment, again not by way of limitation but only by example, this can correspond to providing the sound field in an audio manner by broadcasting such to the hearing prostheses. This can also correspond to simply placing a banner or a poster or a sign or the like in a foyer or other area where people will initially congregate before entering the enclosed volume that displays the sound field.

In an exemplary embodiment, method 1500 further includes method action 1530, which includes providing indicators of the sound field indicating locations conducive to hearing with a hearing prosthesis. Such can correspond to highlighting areas in the sound field that are conducive for people with certain types of hearing prostheses, and highlighting areas in a different manner in the sound field that are conducive for people with other types of hearing prostheses, etc.

As noted above, in an exemplary embodiment, there can be utilitarian value with respect to evaluating or otherwise determining locations of high or low or medium background noise. In an exemplary embodiment, the action of developing the sound field can include evaluating the captured sound to identify locations of lower background noise relative to other locations, all other things being equal. By way of example only and not by way of limitation, in an exemplary scenario, such can have utilitarian value with respect to identifying locations that have utility for children with cochlear implants and/or other types of hearing prostheses. In an exemplary scenario, there are one or more children who attend school who utilize cochlear implants, where a frustrating issue for one or more or all of those children is the inability or otherwise the difficulty of hearing clearly that which the teacher speaks in a classroom because they are assigned to a given seat because there can be too much background noise at that given location (e.g., reverberant noise from an HVAC duct, etc.). In this exemplary scenario, the ability to learn is highly impacted by the ability of the child to hear the teacher's speech. In this exemplary scenario, the acoustical environment of the classroom greatly influences the speech intelligibility of the child.

In this exemplary scenario, by way of example only, the background noise (e.g. fan, air conditioner, etc.), can impact the overall sound field that makes up the acoustic landscape in the classroom. It is noted that while this scenario will focus on background noise, it is noted that in other exemplary embodiments, other features, such as room reverberation, the talking and playing of other children, and/or other classroom acoustical sounds can also impact the makeup of the acoustic landscape of the classroom.

In this exemplary scenario, the sound landscape/acoustical landscape is such that it will make a huge impact as to the hearing perception of a child if he/she is sitting at the center of the classroom or at the edge or the back of the classroom. In this exemplary scenario however, it is not known that this is the case. Accordingly, the teachings detailed herein are utilized to find the useful location (for a given time, also, in some embodiments) for the child to sit in the classroom relative to other locations so as to maximize or otherwise improve the speech intelligibility of the cochlear implant recipients student.

In this exemplary scenario, the teachings detailed herein can be utilized to aid the teacher or parent of the child or other caregiver of the child or even a social service worker to locate the optimal spot in the classroom (at a given time, in some embodiments, where, in some scenarios, the student will be moved or otherwise be permitted to move from one seat to another seat as time progresses owing to a change in the acoustical landscape with time in that given room) in which the speech intelligibility not be deleteriously affected and/or the location where speech intelligibility will be improved. In an exemplary embodiment, this can enable one to better understand and design the layout of a classroom, to ensure that no children are disadvantaged or otherwise to lessen the likelihood that the children are disadvantaged.

It is noted that in at least some exemplary embodiments, the methods detailed herein can be practiced in conjunction with the utilization of an FM wireless audio streaming device where the teacher speaks into a microphone or otherwise where there is a microphone that better captures the teacher's speech, and the resulting signal is wirelessly related to the prosthesis. That said, in at least some exemplary embodiments, the methods detailed herein are explicitly not practiced in conjunction with the utilization of an FM wireless audio streaming device. In this regard, in an exemplary embodiment, this can alleviate resulting hardware and complexity and the time to set up such a system, and can also prevent the scenario where the children utilizing these devices begin do rely on such systems too much, and thus have difficulties learning or otherwise understanding speech in locations or otherwise in localities where such systems are not present. Accordingly, in an exemplary embodiment, there is a method that includes any one or more the method actions detailed herein, along with the method action of capturing sound utilizing a hearing prosthesis at a location based on one or more of the method actions detailed herein. In an exemplary embodiment, this method is executed without utilizing the aforementioned FM wireless audio streaming device.

In an exemplary embodiment, the methods herein can be executed in conjunction with a Telecoil/Room Loop booster system. By way of example, a set of receivers could be used to generate a map of the electromagnetic field of the classroom or any other area having a Telecoil, such as a movie theater, or an auditorium, etc., resulting from the Telecoil, indicating the position for the child to sit to ensure or otherwise improve the likelihood that the prosthesis or other device that receives the signal (e.g., a translation signal for a translation device) Telecoil/Room Loop picks up a utilitarian signal, and/or the strongest signal. Accordingly, in an exemplary embodiment, the teachings detailed herein corresponding to the aforementioned sound fields or otherwise utilizing such also corresponds to a disclosure where the soundfield is instead an electromagnetic field, and the teachings are adapted accordingly to evaluate features of the electromagnetic spectrum as opposed to the sound spectrum.

Figure 16:
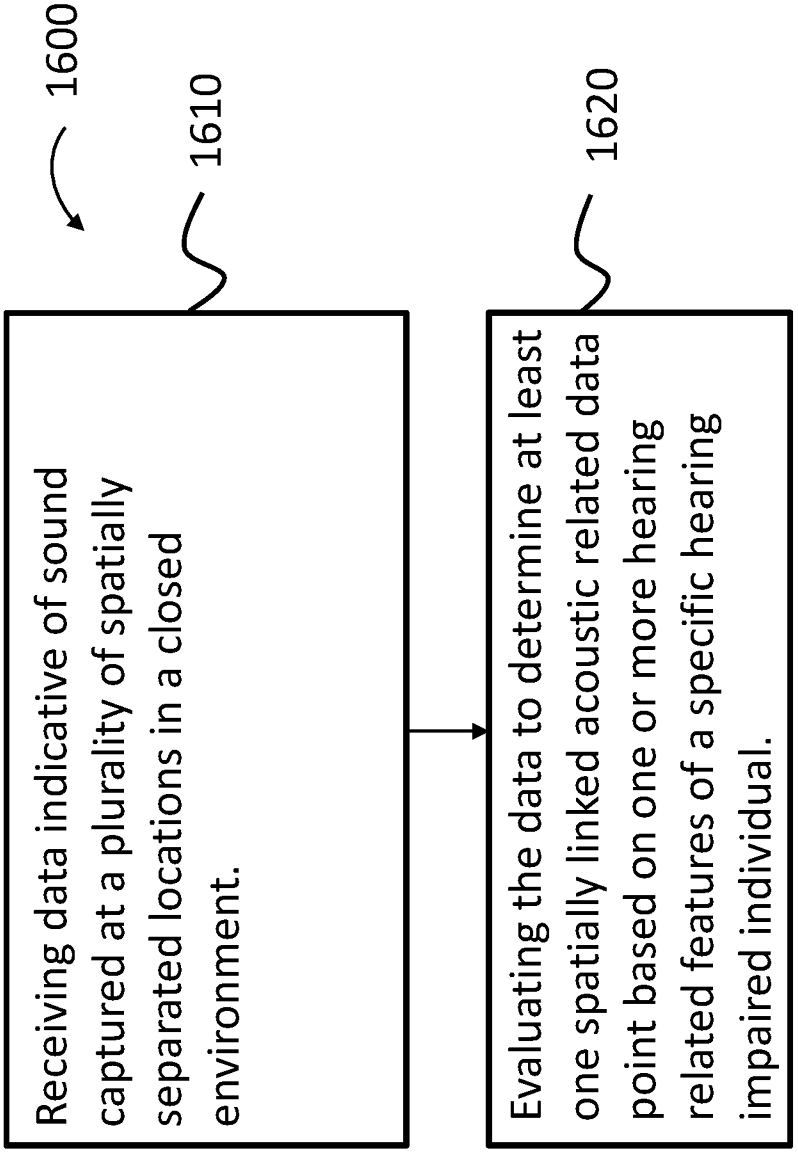

FIG. 16 depicts an exemplary algorithm for an exemplary method, method 1600, which method includes method action 1610, which includes the action of receiving data indicative of sound captured at a plurality of spatially separated locations in a closed environment. In this exemplary embodiment, the enclosed environment has an acoustic environment such that a given sound has different properties at the different locations owing to the acoustic environment. It is noted that in this embodiment, the sound captured at the plurality of spatial separations are all within the area in which the sound can be heard. That said, this method does not require the affirmative capturing the sound. Instead, method action 1610 only requires the reception of data indicative of the sound that is captured at the locations. In this regard, in an exemplary embodiment, method action 1610 can be executed remotely from the closed environment. Still, consistent with the embodiment detailed above, in an exemplary embodiment, method action 1610 can be executed utilizing the central processing assembly that receives input from the various cell phones in the closed environment.

Method 1600 further includes method action 1620, which includes evaluating the data to determine at least one spatially linked acoustic related data point based on one or more hearing related features of a specific hearing impaired person. In an exemplary embodiment, the hearing related feature of the specific individual is that the individual relies on a hearing prosthesis to hear. This is as opposed to a person who is hard of hearing who does not utilize or otherwise does not have on his or her body and operational hearing prosthesis (e.g., it was left at home, it ran out of battery power, etc.), which is still a hearing-impaired individual.

In an exemplary embodiment, the hearing related feature of the specific individual is that the individual has below average dynamic hearing perception at a certain sound level and/or at a particular frequency. Further, the spatially linked acoustic related data point is a location in the enclosed environment were the effects of the below average dynamic hearing perception will be lessened relative to other locations.

In an exemplary embodiment, the hearing related feature of the specific individual is that the individual has below average hearing comprehension at certain reverberation levels. Further, the spatially linked acoustic related data point is a location in the enclosed environment where reverberation levels are lower than at other locations.

In an exemplary embodiment, the hearing related feature of the specific individual is a current profile of a variable profile of a hearing prosthesis worn by the individual. By way of example only and not by way of limitation, in an exemplary embodiment, the profile can be the gain profile and/or the volume profile of a hearing prosthesis, which profile can be changed by the recipient. In this regard, in an exemplary embodiment, method action 1620 is executed based on the current profile (e.g., setting) of, for example, the volume of the prosthesis. Note also that in at least some exemplary embodiments, the variable profile of the hearing prosthesis can be a setting of a noise cancellation system that has various settings and/or the profile can simply be whether or not this system has been activated or not. Still further, the variable profile of the hearing prosthesis can be a beamforming system, and the variable profile can be setting of the beamforming system and/or whether or not the beamforming system is activated. Indeed, in an exemplary embodiment, the one or more hearing related features of a specific hearing-impaired individual can be whether or not the prosthesis that is being utilized by an individual even has a noise cancellation system and/or a beamforming system, etc.

Figure 17:
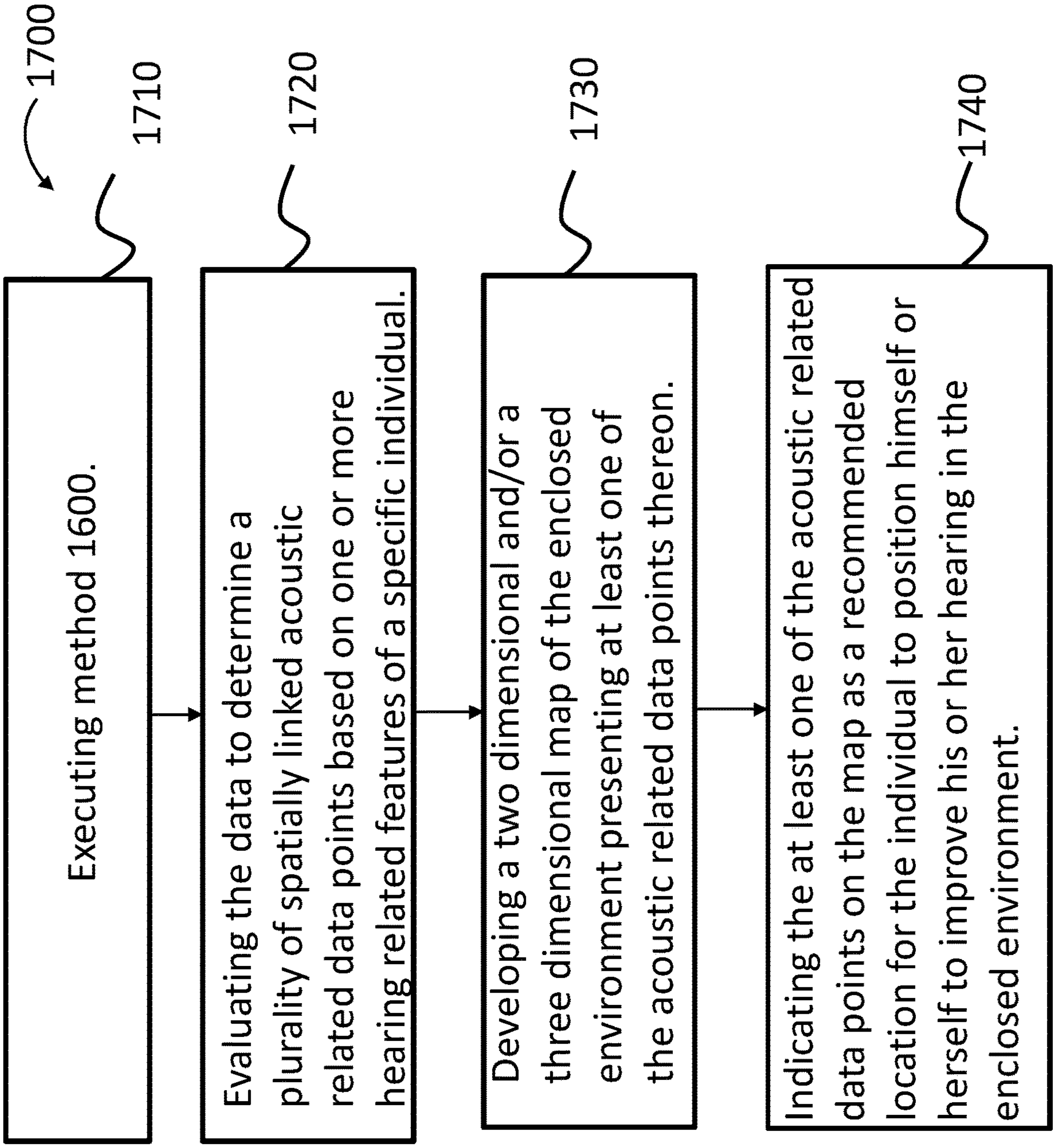

FIG. 17 presents an exemplary method, method 1700, which includes method action 1710, which includes executing method 1600. Method 1700 further includes method action 1720, which includes evaluating the data obtained in method action 1610 to determine a plurality of spatially linked acoustic related data points based on one or more hearing related features of a specific individual. Method 1700 further includes method action 1730, which includes developing a two dimensional and/or a three dimensional map of the enclosed environment presenting at least one of the acoustic related data points thereon. Method 1700 also includes method action 1740, which includes indicating the at least one of the acoustic related data points on the map as a recommended location for the individual to position himself or herself to improve his or her hearing in the enclosed environment. In an exemplary embodiment, this can be executed utilizing the aforementioned display portion of the central processor apparatus, or other display portion of the system. Again, in an exemplary embodiment, such can be presented in a foyer or the like outside an auditorium where people are congregating or otherwise queuing. Still further, in an exemplary embodiment, such can be displayed on a movie theater screen, where, if the hearing impaired persons arrived at the theater early enough, they could move to different seating. Indeed, such presents an exemplary scenario where, for example, for a given movie, the teachings detailed herein are executed for a given theater, and then, for another movie, the teachings detailed herein are then executed for that movie for that same theater. In this regard, because movies will be different, the teachings detailed herein can provide a utilitarian seating arrangement for hearing impaired persons relative to a given movie, which can be different for that same theater when showing another movie. In an exemplary embodiment, such can be executed after the first run or two or three of a given movie, with people in the theater, and then the data developed can be utilized to cordon off or otherwise allocate seating to people with difficulty hearing and/or with hearing prostheses and/or people with specifically cochlear implants. Lots of different things can be done with the concept herein, all of which can enhance the quality of life of people.

Consistent with the teachings above, in an exemplary embodiment, the action of receiving data indicative of sound captured can be executed effectively simultaneously by a plurality of respective microphones of portable devices of transient people relative to the enclosed environment with no relationship to one another are present in the enclosed environment.

Figure 18:
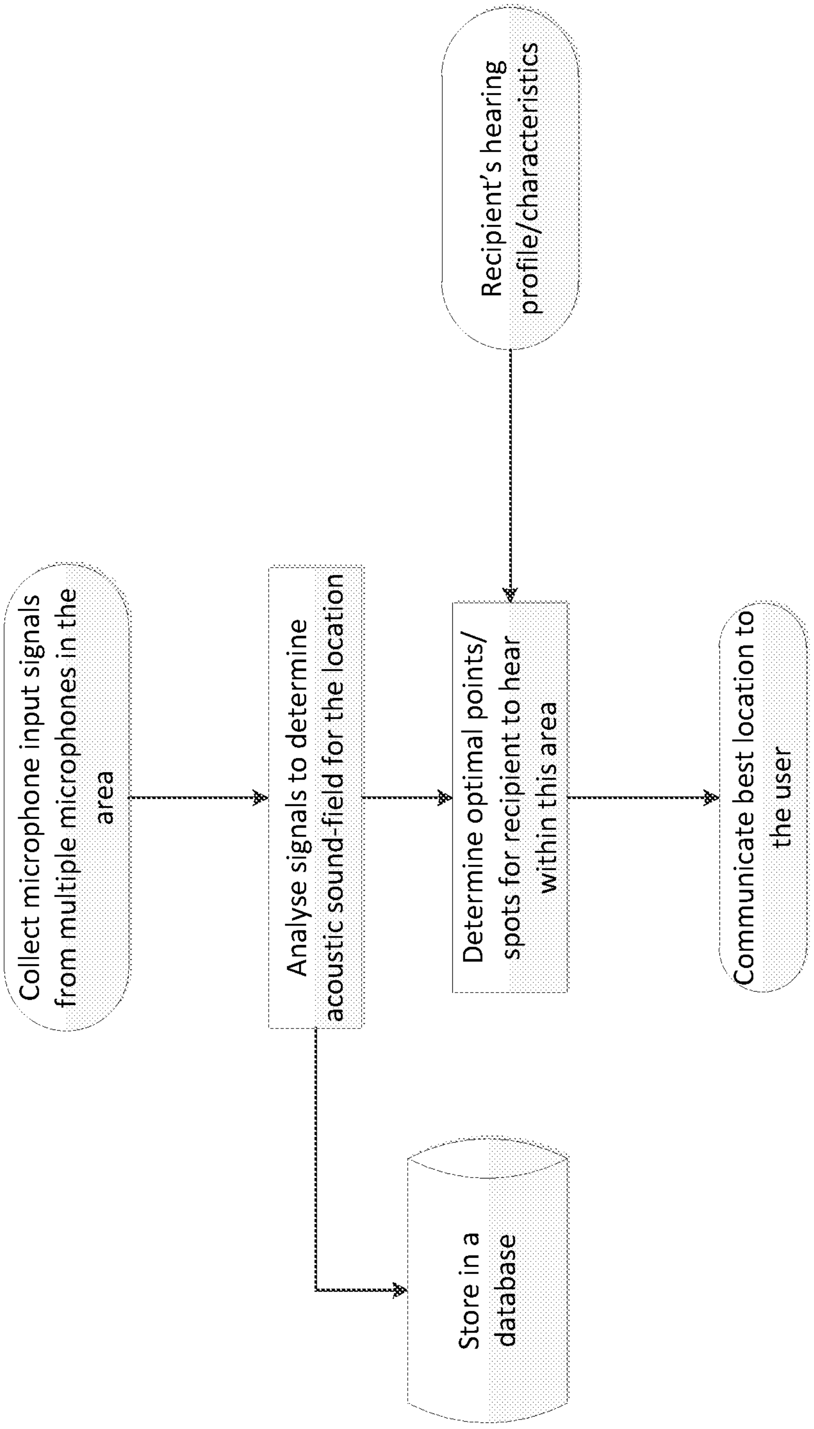
FIG. 18 presents an exemplary algorithm for an exemplary system.

FIG. 18 presents an exemplary system overview according to an exemplary embodiment. Here, the system includes device(s) to collect input acoustic signals from microphones, over wired or wireless connections, where, in some embodiments, connectivity of the total system is obtained via the Internet of Things. A computer then analyzes these signals, decomposing the signals into their various acoustic components, analyzing the relative delays/phases and levels of these components, to form a one, two, or three dimensional sound field map of the environment. This sound-field information is, in some embodiments, time-stamped and stored in a database, for subsequent time-series analysis. In some instances, another input to the system is the hearing profile and listening characteristics and/or hearing prosthesis information related to the recipient. This, along with the determined sound-field, is used in some embodiments to provide recommend specific locations or areas for the recipient where their hearing is more comfortable than at other areas/locations.

In an exemplary embodiment, there is a method, comprising capturing sound at a plurality of respectively effectively spatially separated locations of a locality, evaluating the captured sound, developing a sound field of the locality. In an exemplary embodiment of this embodiment, the action of developing the sound field includes evaluating the evaluated captured sound based on signal to noise ratios of a microphone. In an exemplary embodiment, the methods detailed above and/or below include presenting the sound field of the locality to people who are and/or will be present in the locality and providing indicators of the sound field indicating locations conducive to hearing with a hearing prosthesis. In an exemplary embodiment, the methods detailed above and/or below include evaluating the evaluated captured sound to identify locations of lower background noise relative to other locations, all other things being equal.

It is noted that the disclosure herein includes analysis being executed by certain devices and/or systems. It is noted that any disclosure herein of an analysis also corresponds to a disclosure of an embodiment where an action is executed based on an analysis executed by another device. By way of example only and not by way of limitation, any disclosure herein of a device that analyzes a certain feature and then reacts based on the analysis also corresponds to a device that receives input from a device that has performed the analysis, where the device acts on the input. Also, the reverse is true. Any disclosure herein of a device that acts based on input also corresponds to a device that can analyze data and act on that analysis.

It is noted that any disclosure herein of instructions also corresponds to a disclosure of an embodiment that replaces the word instructions with information, and vice versa.

It is noted that any disclosure herein of an alternate arrangement and/or an alternate action corresponds to a disclosure of the combined original arrangement/original action with the alternate arrangement/alternate action.

It is noted that any method action detailed herein also corresponds to a disclosure of a device and/or system configured to execute one or more or all of the method actions associated there with detailed herein. In an exemplary embodiment, this device and/or system is configured to execute one or more or all of the method actions in an automated fashion. That said, in an alternate embodiment, the device and/or system is configured to execute one or more or all of the method actions after being prompted by a human being. It is further noted that any disclosure of a device and/or system detailed herein corresponds to a method of making and/or using that the device and/or system, including a method of using that device according to the functionality detailed herein.

It is noted that embodiments include non-transitory computer-readable media having recorded thereon, a computer program for executing one or more or any of the method actions detailed herein. Indeed, in an exemplary embodiment, there is a non-transitory computer-readable media having recorded thereon, a computer program for executing at least a portion of any method action detailed herein.

It is further noted that any disclosure of a device and/or system detailed herein also corresponds to a disclosure of otherwise providing that device and/or system.

It is further noted that any element of any embodiment detailed herein can be combined with any other element of any embodiment detailed herein unless stated so providing that the art enables such. It is also noted that in at least some exemplary embodiments, any one or more of the elements of the embodiments detailed herein can be explicitly excluded in an exemplary embodiment. That is, in at least some exemplary embodiments, there are embodiments that explicitly do not have one or more of the elements detailed herein.

While various embodiments of the present invention have been described above, it should be understood that they have been presented by way of example only, and not limitation. It will be apparent to persons skilled in the relevant art that various changes in form and detail can be made therein without departing from the scope of the invention.

What is claimed is:

1. A system, comprising:

a central processor apparatus configured to receive input from one and/or a plurality of sound capture devices, wherein the central processor apparatus is configured to individually and/or collectively evaluate the input from the one and/or plurality of sound capture devices to identify at least one spatial location that is more conducive to hearing with a hearing device relative to another spatial location, the central processor apparatus is configured to receive input pertaining to a particular feature of a given hearing apparatus, and the central processor apparatus is configured to collectively evaluate the input from the one and/or plurality of sound capture devices and the input pertaining to the particular feature of the given hearing device to identify the at least one spatial location that is more conducive to hearing with the given hearing device relative to the another spatial location.

2. The system of claim 1, wherein:

the given hearing apparatus is the hearing device.

3. The system of claim 1, wherein:

the central processor apparatus is configured to receive input from the plurality of sound capture devices;

the central processor apparatus is configured to collectively evaluate the input from the plurality of sound capture devices to identify the at least one spatial location that is more conducive to hearing with the hearing device relative to the another spatial location;

the system further includes a plurality of microphones spatially located at least 3 meters apart from one another;

the microphones are configured to output respective signals indicative of respective captured sounds; and the system is configured to provide the respective signals and/or modified signals based on the respective signals to the central processor apparatus as the input from the plurality of sound capture devices.

4. The system of claim 3, wherein:

the microphones are respectively part of respective products having utility beyond that for use with the system; and the microphones are part of an Internet of Things.

5. The system of claim 1, wherein:

the hearing device is a cochlear implant.

6. The system of claim 1, wherein:

the central processor apparatus is configured to receive input from the plurality of sound capture devices;

the central processor apparatus is configured to collectively evaluate the input from the plurality of sound capture devices to identify the at least one spatial location that is more conducive to hearing with the hearing device relative to the another spatial location;

the hearing device and the hearing apparatus are a cochlear implant hearing prosthesis; and the system is configured to collectively evaluate the input from the plurality of sound capture devices to identify at least one spatial location that is more conducive to hearing with the cochlear implant relative to another spatial location and relative to that which would be the case for another type of hearing prosthesis.

7. The system of claim 1, wherein:

the system is configured to receive input indicative of a specific recipient of the hearing device's hearing profile; and the central processor apparatus is configured to collectively evaluate the input from the one and/or plurality of sound capture devices and the input indicative of the specific recipient to identify the at least one spatial location that is more conducive to hearing with the particular hearing device relative to the another spatial location.

8. The system of claim 1, wherein:

the hearing device is a hearing prosthesis;

the system further includes a display apparatus configured to provide landscape data indicative of the identified at least one spatial location that is more conducive to hearing with the hearing prosthesis relative to another spatial location.

9. A method, comprising:

simultaneously capturing sound at a plurality of respective local globally spatially separated locations utilizing respectively located separate sound capture devices;

evaluating the captured sound;

developing one or more acoustic landmarks based on the captured sound; and evaluating the evaluated captured sound in view of data particular to a hearing related feature of a particular recipient of a hearing device.

10. The method of claim 9, further comprising:

using the developed one or more acoustic landmarks, developing an acoustic landscape that is a two or three dimensional sound field.

11. The method of claim 9, wherein:

the acoustic landmark(s) are geographical location(s) at which a cochlear implant recipient will have a more realistic hearing percept relative to other geographical locations.

12. The method of claim 9, wherein:

the action of evaluating the captured sound includes:

comparing respective gains of the captured sound;

comparing respective phases of the captured sound; and the action of developing one or more acoustic landmarks includes:

utilizing known locations of the respective sound capture devices relative to a fixed location and/or relative to one another in combination with the evaluated captured sound to develop weighted locations weighted relative to sound quality.

13. The method of claim 9, wherein the action of developing one or more acoustic landmarks includes:

identifying a location conducive to hearing ambient sound originating in the vicinity of the sound capture devices based on the evaluation of the evaluated captured sound evaluated in view of the data indicative of the recipient of a hearing device.

14. The method of claim 13, further comprising:

providing the recipient of the hearing device data relating to the acoustic landmarks based on the captured sound via wireless communication with a body carried device of the recipient, wherein the hearing device is a hearing prosthesis.

15. The method of claim 9, wherein the action of developing one or more acoustic landmarks based on the captured sound includes determining a spatial location where there is minimal noise and/or reverberation interference relative to another spatial location based on the evaluation of the captured sound.

16. The method of claim 9, further comprising:
subsequently utilizing the plurality of sound capture devices to capture sound for reasons unrelated to developing one or more acoustic landmarks based on the captured sound.

17. A method, comprising:
capturing sound at a plurality of respectively effectively spatially separated locations of a locality;
evaluating the captured sound; and
developing a sound field of the locality, wherein
the developed sound field is a first sound field of the locality, and
the method further includes, at a temporal location substantially different from that at which the first sound field was developed:
capturing second sound at a plurality of respectively effectively spatially separated locations of the locality;
evaluating the second captured sound; and
developing a second sound field of the locality where the second sound was captured based on the action of evaluating the second captured sound.

18. The method of claim 17, wherein:
the sound field is a three dimensional sound field.

19. The method of claim 17, wherein the action of developing the first sound field includes:
evaluating the evaluated captured sound in view of data particular to a hearing related feature of a particular recipient of a hearing prosthesis.

20. The method of claim 17, wherein the action of developing the first sound field includes:
evaluating the evaluated captured sound in view of statistical data relating to cochlear implant recipients.

21. The method of claim 17, wherein:
in between the development of the first sound field and the development of the second sound field, the acoustic environment of the locality has effectively changed.

22. The method of claim 17, further comprising:
identifying a recurring time period where, statistically, the sound environment is more conducive to a recipient of a hearing prosthesis relative to other time periods based on a comparison of at least the first and second sound fields.

23. A method, comprising:
receiving data indicative of sound associated with a plurality of spatially separated locations in an enclosed environment, wherein the enclosed environment has an acoustic environment such that a given sound has different properties at the different locations owing to the acoustic environment; and
evaluating the data to determine at least one spatially linked acoustic related data point based on one or more hearing related features of a specific individual.

24. The method of claim 23, wherein:
the hearing related feature of the specific individual is that the individual relies on a hearing prosthesis to hear.

25. The method of claim 23, wherein:
the specific individual is a hearing impaired individual;
the hearing related feature of the specific individual is that the individual has below average dynamic hearing perception at a certain sound level and/or at a particular frequency; and
the spatially linked acoustic related data point is a location in the enclosed environment where the effects of the below average dynamic hearing perception will be lessened relative to other locations.

26. The method of claim 23, wherein:
the specific individual is a hearing impaired individual;
the hearing related feature of the specific individual is that the individual has below average hearing comprehension at certain reverberation levels; and
the spatially linked acoustic related data point is a location in the enclosed environment where the reverberation levels are lower than at other locations.

27. The method of claim 23, wherein:
the specific individual is a hearing impaired individual;
the hearing related feature of the specific individual is a current profile of a variable profile of a hearing prosthesis worn by the individual.

28. The method of claim 23, further comprising:
evaluating the data to determine a plurality of spatially linked acoustic related data points based on one or more hearing related features of a specific individual;
developing a two dimensional and/or a three dimensional map of the enclosed environment presenting at least one of the acoustic related data points thereon; and
indicating the at least one of the acoustic related data points on the map as a recommended location for the individual to position himself or herself to improve his or her hearing in the enclosed environment.

29. The method of claim 23, wherein:
the action of receiving data is executed effectively simultaneously by a plurality of respective microphones of portable devices of transient people relative to the enclosed environment with no relationship to one another who are present in the enclosed environment.

30. The system of claim 1, wherein:
the central processor apparatus is configured to receive input indicative of a specific recipient of a given hearing prosthesis's hearing profile.

31. The method of claim 17, further comprising:
identifying a recurring time period where, statistically, a sound environment of the locality is more conducive to a recipient of a hearing prosthesis relative to other time periods based on a comparison of the developed first sound field and a subsequently developed third sound field developed after the developed first sound field.

32. The method of claim 23, further comprising:
based on the action of evaluating, indicating the acoustic related data point as a recommended location for the individual to position himself or herself to improve his or her hearing in the enclosed environment.

33. The method of claim 17, further comprising:
developing a three-dimensional locational dataset of the plurality of the respectively effectively spatially separated locations where the sound was captured.

34. The method of claim 17, further comprising:
developing a three-dimensional locational dataset of the plurality of respectively effectively spatially separated locations where the sound was captured prior to developing the sound field of the locality, wherein
the action of developing the first sound field of the locality is based on the developed three-dimensional locational dataset.

35. The method of claim 19, further comprising:
while developing the first sound field and while evaluating the evaluated captured sound, producing an audio output using the hearing prosthesis based on the evaluated evaluated captured sound.

36. The method of claim 19, wherein:
evaluating the evaluated captured sound is executed before evoking a hearing percept with the hearing prosthesis based on the first sound field.

37. The method of claim 9, wherein: the hearing device is a hearing prosthesis.

38. The method of claim 23, wherein: the data received is captured at a plurality of spatially separate locations.

39. The system of claim 3, wherein: the plurality of microphones spatially located at least 3 meters apart from one another are located in a same room.

40. The system of claim 4, wherein: the microphones are parts of respective stationary devices in a building.

41. The system of claim 4, wherein: the microphones are parts of fixed devices in a building.

42. The method of claim 28, wherein: the specific individual is a hearing impaired individual.

43. The system of claim 7, wherein: the central processor apparatus is configured to receive input from the plurality of sound capture devices; the central processor apparatus is configured to collectively evaluate the input from the plurality of sound capture devices to identify the at least one spatial location that is more conducive to hearing with the hearing device relative to the another spatial location; and the hearing device is a hearing prosthesis.

44. The system of claim 1, wherein: the hearing apparatus is the hearing device.

45. The system of claim 1, wherein: the central processor apparatus is configured to receive input from the plurality of sound capture devices; the central processor apparatus is configured to collectively evaluate the input from the plurality of sound capture devices to identify the at least one spatial location that is more conducive to hearing with the hearing device relative to the another spatial location; and the system is configured to collectively evaluate the input from the plurality of sound capture devices to identify at least one spatial location that is more conducive to hearing with the hearing device relative to another spatial location and relative to that which would be the case for another type of hearing device.

46. The method of claim 17, wherein: the first sound field is one of a two dimensional sound field or a three dimensional sound field developed based on the evaluating of the captured sound.

47. The method of claim 17, further comprising: developing a three-dimensional locational dataset of the plurality of respectively effectively spatially separated locations where the sound was captured prior to developing the first sound field of the locality, wherein the action of developing the first sound field of the locality is based on the developed three-dimensional locational dataset.

48. The system of claim 5, wherein: the central processor apparatus is a personal computer.

49. The system of claim 1, further comprising: a server, wherein the central processor apparatus is in signal communication with the server.

* * * * *